(12) United States Patent
Clovis et al.

(10) Patent No.: US 7,352,694 B1
(45) Date of Patent: Apr. 1, 2008

(54) SYSTEM AND METHOD FOR TOLERATING DATA LINK FAULTS IN A PACKET COMMUNICATIONS SWITCH FABRIC

(75) Inventors: Philip Michael Clovis, San Diego, CA (US); Eli James Aubrey Fernald, San Diego, CA (US); John David Huber, San Diego, CA (US); Kirk Alvin Miller, San Diego, CA (US); Sushil Kumar Singh, San Diego, CA (US); Prayag Bhanubhai Patel, San Diego, CA (US); Kenneth Yi Yun, San Diego, CA (US); George Beshara Bendak, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 1010 days.

(21) Appl. No.: 10/373,139

(22) Filed: Feb. 24, 2003

Related U.S. Application Data

(63) Continuation-in-part of application No. 10/035,835, filed on Dec. 24, 2001, now Pat. No. 7,020,131, and a continuation-in-part of application No. 10/029,581, filed on Dec. 20, 2001, and a continuation-in-part of application No. 10/022,673, filed on Dec. 17, 2001, now Pat. No. 7,079,545, and a continuation-in-part of application No. 10/023,266, filed on Dec. 14, 2001, now abandoned.

(51) Int. Cl.
*G01R 31/08* (2006.01)
*G06F 11/00* (2006.01)

(52) U.S. Cl. .................................. 370/217; 370/225

(58) Field of Classification Search .............. None
See application file for complete search history.

(56) References Cited

U.S. PATENT DOCUMENTS

| | | | | |
|---|---|---|---|---|
| 6,067,286 A * | 5/2000 | Jones et al. | ................. | 370/218 |
| 6,411,599 B1 * | 6/2002 | Blanc et al. | ................. | 370/219 |
| 6,636,932 B1 * | 10/2003 | Regev et al. | ............... | 710/317 |
| 6,804,193 B1 * | 10/2004 | Dubreuil | ..................... | 370/217 |
| 6,870,831 B2 * | 3/2005 | Hughes et al. | ............. | 370/352 |
| 6,895,528 B2 * | 5/2005 | Cantwell et al. | ............ | 714/12 |
| 6,990,063 B1 * | 1/2006 | Lenoski et al. | ............ | 370/218 |
| 7,035,212 B1 * | 4/2006 | Mittal et al. | ................ | 370/230 |

(Continued)

*Primary Examiner*—Kwang Bin Yao
*Assistant Examiner*—Warner Wong
(74) *Attorney, Agent, or Firm*—Law Office of Gerald Maliszewski; Gerald Maliszewski

(57) ABSTRACT

A system and method are provided for tolerating data line faults in a packet communications switch fabric. The method comprises: accepting information packets including a plurality of cells, at a plurality of ingress port card ports, the plurality of information packets addressing a plurality of egress port card ports; selectively connecting port card ports to port card backplane data links; selectively connecting port card backplane data links and crossbars; sensing a connection fault in a backplane data link; in response to sensing the fault, reselecting connections between the port card ports and the port card backplane data links; in response to reselecting connections between the port card ports and the port card backplane data links, serially transferring packets through the port cards; serially transferring packets through the crossbars to the egress port cards; and, suspending use of the faulty connection.

35 Claims, 23 Drawing Sheets

U.S. PATENT DOCUMENTS 7,180,867 B2 * 2/2007 Hoch et al. .................. 370/244
2002/0105966 A1 * 8/2002 Patel et al. .................. 370/463
2004/0085894 A1 * 5/2004 Wang et al. ................. 370/216

* cited by examiner

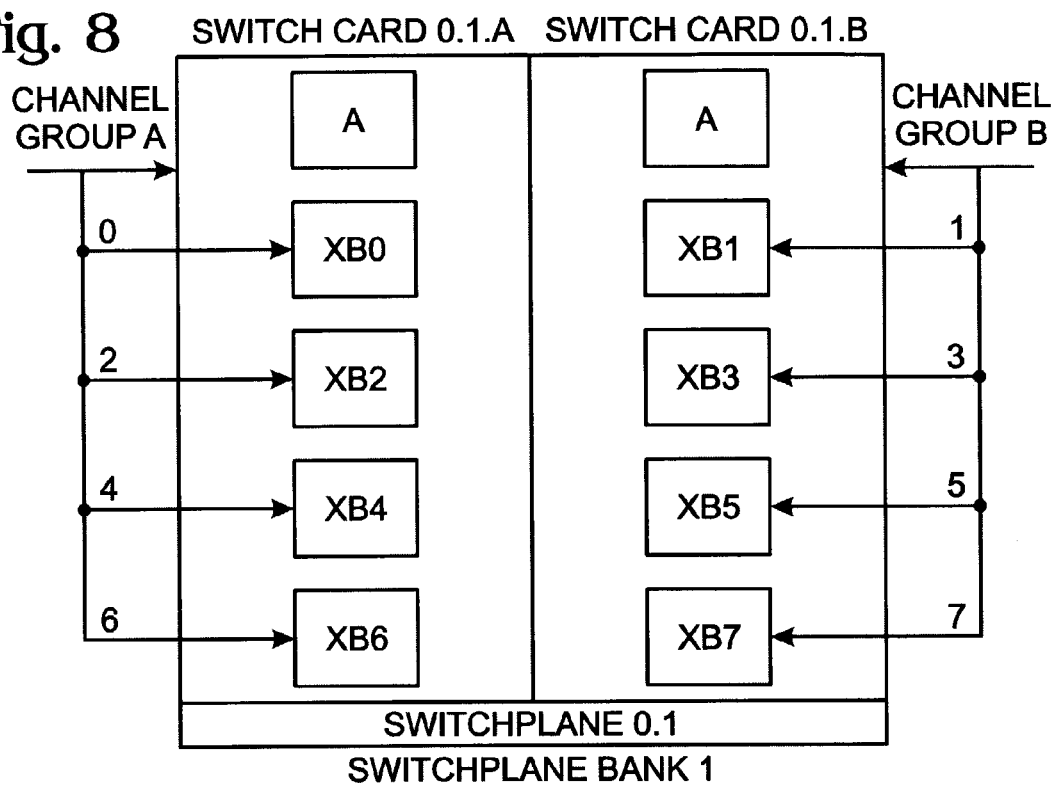
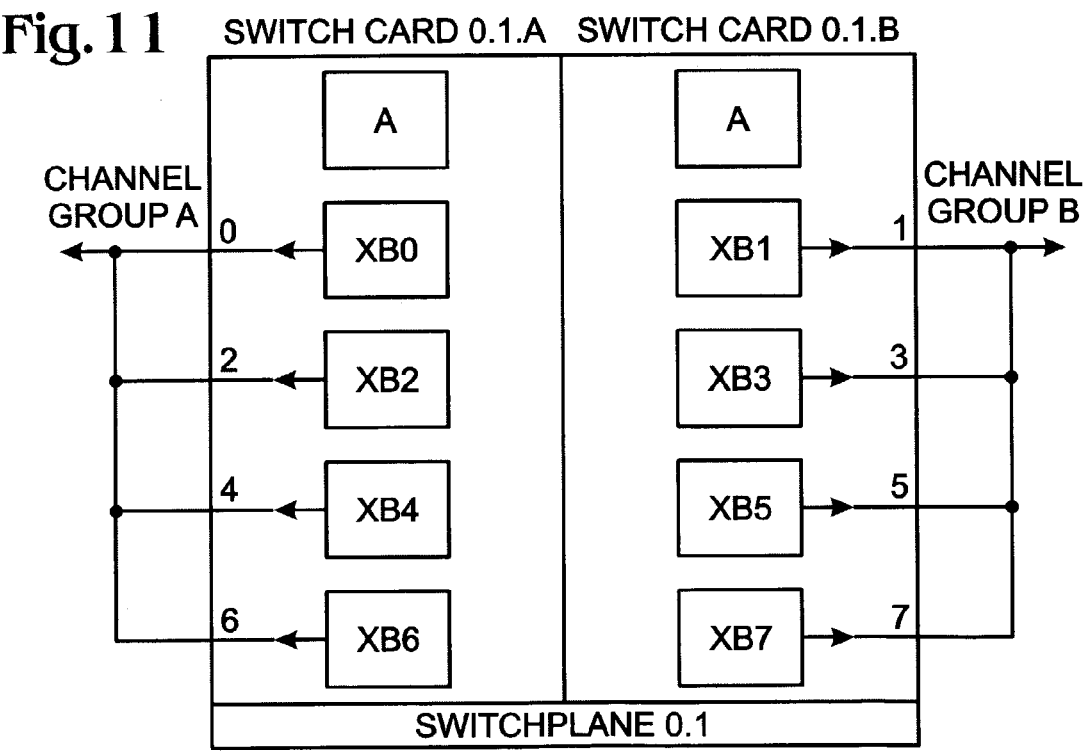

Fig. 18

| | S8905 MS (INGRESS) | | | | S8905 MS (EGRESS) | | |
|---|---|---|---|---|---|---|---|
| | IN | OUT | | | IN | OUT | |
| INGRESS CHANNEL 0 | 0<br>1<br>2<br>3<br>4<br>5<br>6<br>7<br>8<br>9 | 0<br>1<br>2<br>3<br>4<br>5<br>6<br>7<br>8<br>9 | BACKPLANE CHANNEL 0 | BACKPLANE CHANNEL 0 | 0<br>1<br>2<br>3<br>4<br>5<br>6<br>7<br>8<br>9 | 0<br>1<br>2<br>3<br>4<br>5<br>6<br>7<br>8<br>9 | EGRESS CHANNEL 0 |
| INGRESS CHANNEL 1 | 10<br>11<br>12<br>13<br>14<br>15<br>16<br>17<br>18<br>19 | 10<br>11<br>12<br>13<br>14<br>15<br>16<br>17<br>18<br>19 | BACKPLANE CHANNEL 1 | BACKPLANE CHANNEL 1 | 10<br>11<br>12<br>13<br>14<br>15<br>16<br>17<br>18<br>19 | 10<br>11<br>12<br>13<br>14<br>15<br>16<br>17<br>18<br>19 | EGRESS CHANNEL 1 |
| INGRESS CHANNEL 2 | 20<br>21<br>22<br>23<br>24<br>25<br>26<br>27<br>28<br>29 | 20<br>21<br>22<br>23<br>24<br>25<br>26<br>27<br>28<br>29 | BACKPLANE CHANNEL 2 | BACKPLANE CHANNEL 2 | 20<br>21<br>22<br>23<br>24<br>25<br>26<br>27<br>28<br>29 | 20<br>21<br>22<br>23<br>24<br>25<br>26<br>27<br>28<br>29 | EGRESS CHANNEL 2 |
| INGRESS CHANNEL 3 | 30<br>31<br>32<br>33<br>34<br>35<br>36<br>37<br>38<br>39 | 30<br>31<br>32<br>33<br>34<br>35<br>36<br>37<br>38<br>39 | BACKPLANE CHANNEL 3 | BACKPLANE CHANNEL 3 | 30<br>31<br>32<br>33<br>34<br>35<br>36<br>37<br>38<br>39 | 30<br>31<br>32<br>33<br>34<br>35<br>36<br>37<br>38<br>39 | EGRESS CHANNEL 3 |

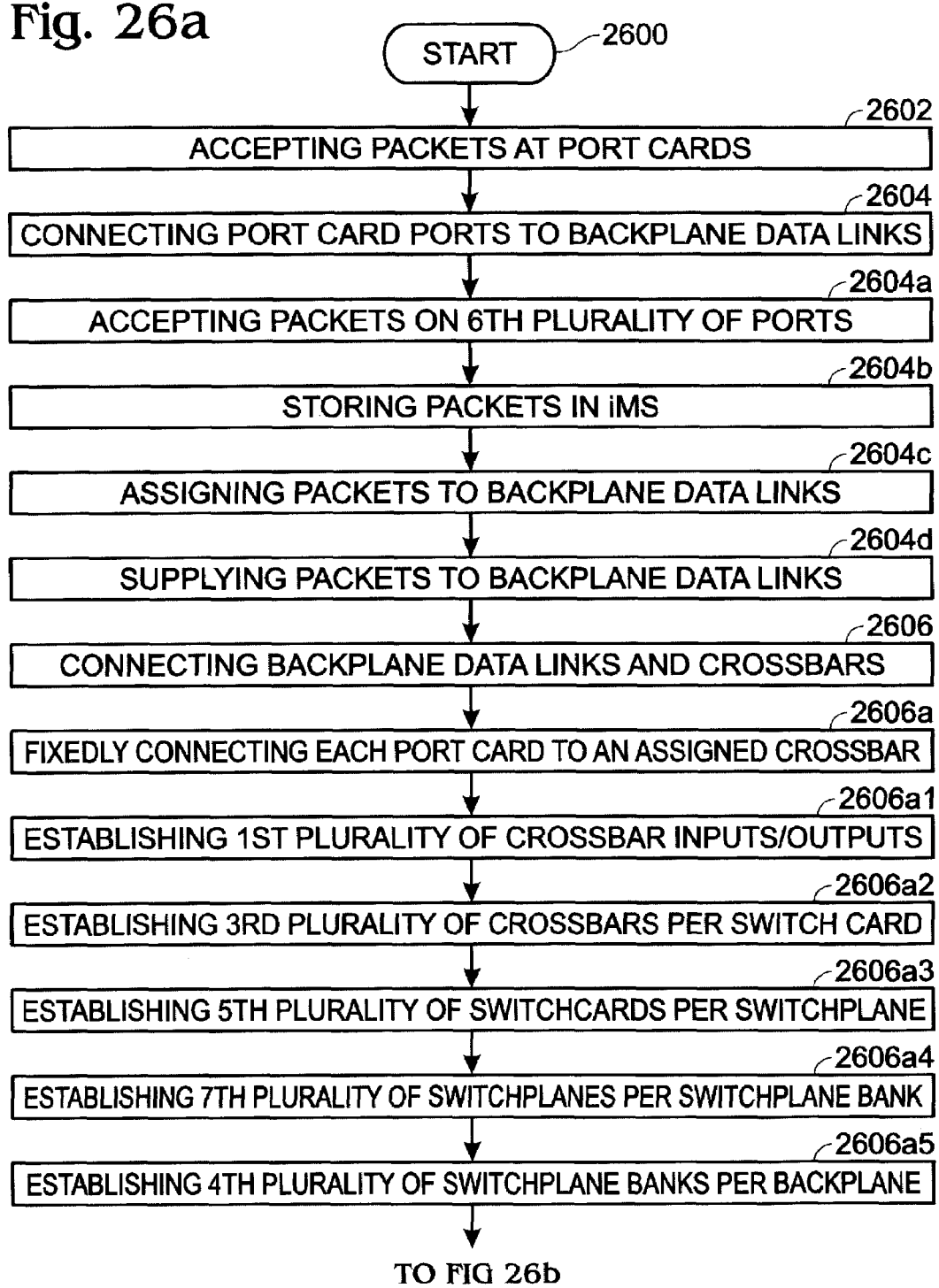

SYSTEM AND METHOD FOR TOLERATING DATA LINK FAULTS IN A PACKET COMMUNICATIONS SWITCH FABRIC

RELATED APPLICATIONS

This application is a continuation-in-part of application entitled, SYSTEM AND METHOD FOR SWITCHING VARIABLY SIZED INFORMATION GROUPS, invented by Yun et al., Ser. No. 10/023,266, , filed Dec. 14, 2001 now abandoned.

This application is a continuation-in-part of application entitled, SYSTEM AND METHOD FOR SIMULTANEOUS DEFICIT ROUND ROBIN PRIORITIZATION, invented by Yun et al., Ser. No. 10/022,673, filed Dec. 17, 2001 now U.S. Pat. No. 7,079,545.

This application is a continuation-in-part of a pending application entitled, SYSTEM AND METHOD FOR GRANTING ARBITRATED BIDS IN THE SWITCHING OF INFORMATION, invented by Yun et al., Ser. No. 10/029,581, filed Dec. 20, 2001.

This application is a continuation-in-part of application entitled, SYSTEM AND METHOD FOR HIERARCHIAL SWITCHING, invented by Yun et al., Ser. No. 10/035,835, filed Dec. 24, 2001 now U.S. Pat. No. 7,020,131.

BACKGROUND OF THE INVENTION

1. Field of the Invention

This invention generally relates to packet communications and, more particularly, to a system and method for detecting and tolerating data line faults in a packet communications switch fabric.

2. Description of the Related Art

There is industry demand for integrated circuits (ICs) switching systems that can be easily scaled for Network Access, the Network Edge, or a Core Switch Router, at the high end. SCSA (Signal Computing System Architecture) defines a switch fabric to be the facility for connecting any two (or more) transmitting or receiving Service Providers.

FIG. 27 is a schematic block diagram of a general switch fabric system (prior art). Traffic enters the system on the ingress side (the left side of the figure). Traffic exits the system on the egress side (the right side of the figure). The port card ingress and egress structures are sometimes subdivided into channels and subchannels. The packet headers specify a required destination port card, channel, and subchannel. The system must synchronously route each ingress packet to the correct egress destination.

Packets are converted into frames by ingress traffic managers (iTMs). A frame is a logical unit of data, which is often a small piece of a much larger data set such as a file or image. The iTMs feed the ingress side of the fabric. The switch fabric might convert the frame format to a "native" format, and then on egress, convert the data back into the TM frame format before sending the data to the egress traffic managers (eTMs). If the frames are fixed size (for example: 53 bytes, 64 bytes, or 80 bytes), the frames are often called cells.

Protocol Specific vs. Protocol Agnostic

A switch fabric can be protocol specific or protocol agnostic. An example of a protocol specific switch fabric would be a system designed and optimized specifically for asynchronous transfer mode (ATM) traffic. Another example would be a switch that handles only TCP/IP traffic. The obvious disadvantage of a switch fabric hardwired to handle a specific protocol is lack of flexibility. Service providers want to sell services to a variety of customers in various industries. Protocols vary from industry to industry.

Even within one protocol type, there can be protocol upgrades. For example, TCP/IP, the machine language of Internet routers, now runs primarily "IPv4." This protocol, successful as it has been, has a lack of available addresses, poor security features, and no "quality of service" (QoS) provisions. The next generation Internet protocol is "IPv6." It provides solutions to these limitations.

A protocol agnostic switch fabric works equally well with all protocol types, however, the traffic manager must be responsible for recognizing specific protocol types. The disadvantage of a protocol agnostic switch fabric is that it may be more complicated, and perhaps slower than a switch fabric dedicated to a particular protocol.

Packet Striping vs. Single Link per Packet

The simplest way for a traffic manager to transmit a packet into a switch fabric is to transmit the packet serially along one line. Striping is a way of achieving higher bandwidth by transmitting a single packet across multiple ingress/egress lines. For example, a TM can transmit a packet into a switch fabric eight times as fast if the packet is sliced into eight pieces (stripes) by the TM, and conveyed into the fabric along 8 parallel lines simultaneously. The fabric captures the packet in memory, routes it to the required egress destination, and slices the packet into 8 parallel lines before transmitting the packet to the egress TM.

The upside to packet striping is the potential for lower latency. There are several negative aspects of packet striping:

if one of the links is damaged (1 of 8 in the example above), the entire channel is out of service, degrading fault tolerance; and, the interface between the TM and switch fabric is more complicated. Circuitry must be used to slice the packet into stripes and reassemble it into packets.

Single-Cell Packet vs. Multi-Cell Packets

Many switch fabrics now deployed and passing revenue traffic, especially in wide area networks (WANs), use asynchronous transfer mode (ATM) packets. ATM packets are single-cell packets, with a fixed cell size of 53 bytes, 48 bytes of which is the information payload. The ATM specification evolved in the 1980s and early 1990s. It was then believed that variable length (multi-cell) packets would be too difficult to implement at rates needed for wire-speed traffic. The single-cell solution was a compromise that would work for voice data, video data, multimedia data, email data, file data, etc. With a fixed frame size, switch designs are simplified and ultimately faster.

However, files are better sent in large frames. Voice switching performs better with small bursts of data, corresponding to analog-to-digital converter time slots. Large frames and concomitant switching latencies can render a switch useless for most 2-way voice applications. Voice communications require low latency (time delay). Since ATM had to work for all network data, the small payload (voice) requirements prevailed at the expense of the large frame applications.

For large frames or packets it is much more efficient to establish a path from an ingress port card to the required egress destination, and then leave this path undisturbed until the packet is completed. With single cell packets, the ingress port card must bid for, accept grants, and then schedule each cell of a multi-cell packet.

There are also Frame Relay switch fabrics. Frame Relay is a single-cell protocol, albeit with frame size ranging from 6 to 4096 bytes. Such switch fabrics have been deployed and passing revenue traffic since the early 1990s. These switch fabrics have generally not been used for voice data because of the large latency. Only highly compressed voice traffic works well over frame relay. Voice-over-frame relay was added as an afterthought by network engineers. Frame relay excels at data communications such as local area network internetworking (LAN-to-LAN). Such communications are very high speed and bursty, with non-critical latency constraints.

Cut-Through vs. Store-and-Forward

The conventional method of switch fabric packet routing is called Store-and-Forward. In this method, the switch fabric accepts an input packet and buffers the packet on the ingress side of the fabric, making sure the packet was received intact, knowing the exact number of cells in the packet. The problem with the store-and-forward method is the added latency of buffering the packet. In Cut-though Packet Routing (CPR), a switch fabric is able to send the incoming packet cells to the correct egress port as soon as the destination address is known.

Memory-Based vs. Arbitrated Crossbar

A switch fabric can use memory-based crossbars or arbitrated crossbars. A memory-based crossbar is sometimes called a "shared memory switch." Ingress packets flow from the port cards into a huge memory bank, which serve as the switch. From the memory bank, the destination address is determined from egress port destination information in the cell headers. The problem with these switch fabrics is that they become prohibitively expensive and large from all the required high-speed memory. Such fabrics cannot be used to reach terabit total switching speeds with technology available today.

It would be advantageous if a switch fabric could use arbitrated crossbars to reduce the need for high-speed memory.

It would be advantageous if a switch fabric could use Cut-though packet routing to reduce latency.

It would be advantageous if a switch fabric could handle multi-cell packets, so as to switch larger-sized packets with a reduced latency.

It would be advantageous if a switch fabric could use a single-link for each packet, to improve the system fault tolerance and simplify the interface to a TM.

It would be advantageous if the above-mentioned switch fabric could operate protocol agnostic.

SUMMARY OF THE INVENTION

Accordingly, a method is provided for tolerating data line faults in a packet communications switch fabric. The method comprises: accepting information packets including a plurality of cells, at a plurality of ingress port card ports, the plurality of information packets addressing a plurality of egress port card ports; selectively connecting port card ports to port card backplane data links; selectively connecting port card backplane data links and crossbars; sensing a connection fault in a backplane data link; in response to sensing the fault, reselecting connections between the port card ports and the port card backplane data links; in response to reselecting connections between the port card ports and the port card backplane data links, serially transferring packets through the port cards; serially transferring packets through the crossbars to the egress port cards; and, suspending use of the faulty connection.

More specifically, selectively connecting port card backplane data links and crossbars includes: for a particular backplane data link, for example channel 0/channel group A/data link 0, fixedly connecting each port card to a corresponding interface of an assigned crossbar; and, selectively enabling the connection to each crossbar for the duration of the packet to be transferred. Fixedly connecting each port card to a corresponding interface of an assigned crossbar, for a particular backplane data link, includes: establishing a first plurality of crossbar input ports and a first plurality of crossbar output ports; establishing a third plurality of crossbars per switch card.

Selectively connecting port card ports to port card backplane data links includes: each port card accepting/supplying packets on a sixth plurality of traffic manager ingress/egress data links through a corresponding sixth plurality of port card ingress/egress ports; storing the accepted packets in a port card ingress/egress memory subsystem (iMS/eMS).

Additional details of the above-described method and a system for tolerating data line faults in a packet communications switch fabric are provided below.

BRIEF DESCRIPTION OF THE DRAWINGS

FIG. 8 is a schematic block diagram depicting switchplane 0.1, of switchplane bank 1, in greater detail, accepting backplane data links.

FIG. 11 is a schematic block diagram depicting switchplane 0.1, of switchplane bank 1, in greater detail, supplying backplane data links.

FIG. 18 is a diagram illustrating link to channel assignments.

FIGS. 26a and 26b are flowcharts illustrating the present invention method for tolerating data line faults in a packet communications switch fabric.

DETAILED DESCRIPTION OF THE PREFERRED EMBODIMENTS

Figure 1:
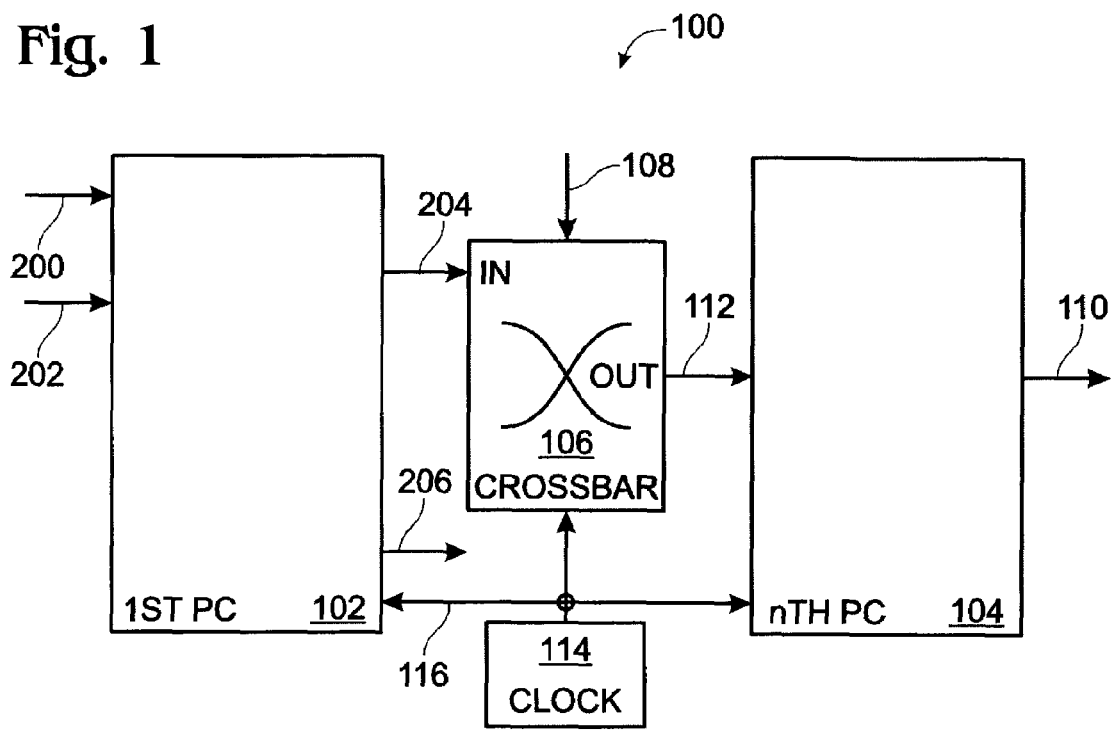
FIG. 1 is a schematic block diagram of the present invention switch fabric system for tolerating data line faults in a packet communications.

FIG. 1 is a schematic block diagram of the present invention switch fabric system for tolerating data line faults in a packet communications. The system 100 typically comprises a plurality of port cards. Two port cards are specifically shown, a first port card (PC) 102 and an nth port card 104. The value of n is not limited to any particular value, and the system can even be enabled with a single switch card.

Figure 2:
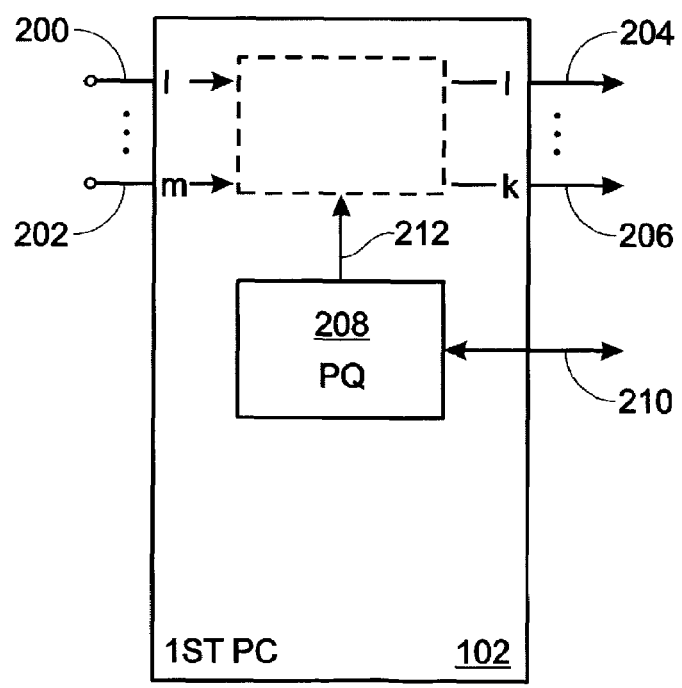
FIG. 2 is a schematic block diagram detailed view of the first port card of FIG. 1.

FIG. 2 is a schematic block diagram detailed view of the first port card 102 of FIG. 1. Each port card, as exemplified by the first port card 102, includes a plurality of ports to communicate information packets, including a plurality of cells, with a network (not shown). Specifically, ports 1 through m are shown connected to lines 200 and 202, respectively. Again, the value of m is undefined and the system could be enabled with just a single port, or many ports.

A plurality of backplane data links transfers packets between port cards. Backplane data links 1 through k are shown connected to lines 204 and 206, respectively. The value of k is not limited to any particular value, and may even be "1".

Each port card includes at least one priority queue (PQ) 208 having a control port on line 210 to accept faulty packet error messages, to send transfer messages (line 212) reselecting intra-port card connections between ports and the backplane data links in response to error messages. The control port also communicates messages (line 210) controlling the inter-port card transfer of packets on the backplane data links.

Returning the FIG. 1, the system 100 includes at least one crossbar 106 having a control input on line 108 operatively connected to accept control signals from the PQ (see FIG. 2). As used herein, the term "operatively connected" means indirectly connected or connected through an intervening element. The crossbar 106 selectively connects crossbar inputs and crossbar outputs in response to the PQ control signals.

The port cards serially transfer packets on connected ingress data links 200 through 202, and egress data link 110. The port card backplane data links 204 and 112 serially transfer packets. More particularly, the port cards receive the packets serially, as each packet is received on a single link, and transmit the packets serially. However, the port cards typically buffer the received packets in parallel between reception and transmission. Likewise, the crossbar 106 serially transfers packets between port cards 102 and 104.

The crossbar 106 input and output interfaces are fixedly connected, and selectively enabled, to a backplane data link from each port card. As used herein, the term "fixedly connected" means hardwired. When enabled, the crossbar interface is enabled for the duration of the packet being serially transferred through the crossbar. Alternately stated, although the backplane link on line 204 (for example) is hardwired between the first port card 102 and the crossbar 106, packets that are received by the first port card 102, on line 200 for example, need not necessarily be passed on backplane link 204, as other backplane data links are typically available. The redundancy in backplane links is one of the features that permits the system to tolerate backplane data link faults. For example, if backplane data link 204 is faulty, packets can be transferred from the first port card on backplane data link 206.

Returning briefly to FIG. 2, in the event of a backplane data link failure on line 204 for example, the PQ selects backplane data link k (line 206) for example. Following such a reselection of intra-port card connections between the ports and the backplane channels, the PQ 208 sends transfer messages on line 212 suspending use of the backplane data link (in this example data link 1 on line 204).

Returning the FIG. 1, the system 100 further comprises a clock 114 having a cell cycle output connected to each port card and crossbar on line 116. Each port card serially transfers packets on the backplane data links at the rate of one cell per cell cycle. The PQ (see FIG. 2) sends a transfer message reselecting intra-port card connections within two cell cycles of receiving an error message.

Each crossbar, crossbar 106 for example, includes a first plurality of crossbar input ports connected to ingress backplane data links. Shown are input ports 1 through r. The crossbar also includes a first plurality of crossbar output ports connected to egress backplane data links. Shown are crossbar output ports 1 through s. Again, r and s are not limited to any particular value, but the values of r and s are typically the same. As explained in detail below, each crossbar input (or output) is typically to a different port card in the system.

Figure 3:
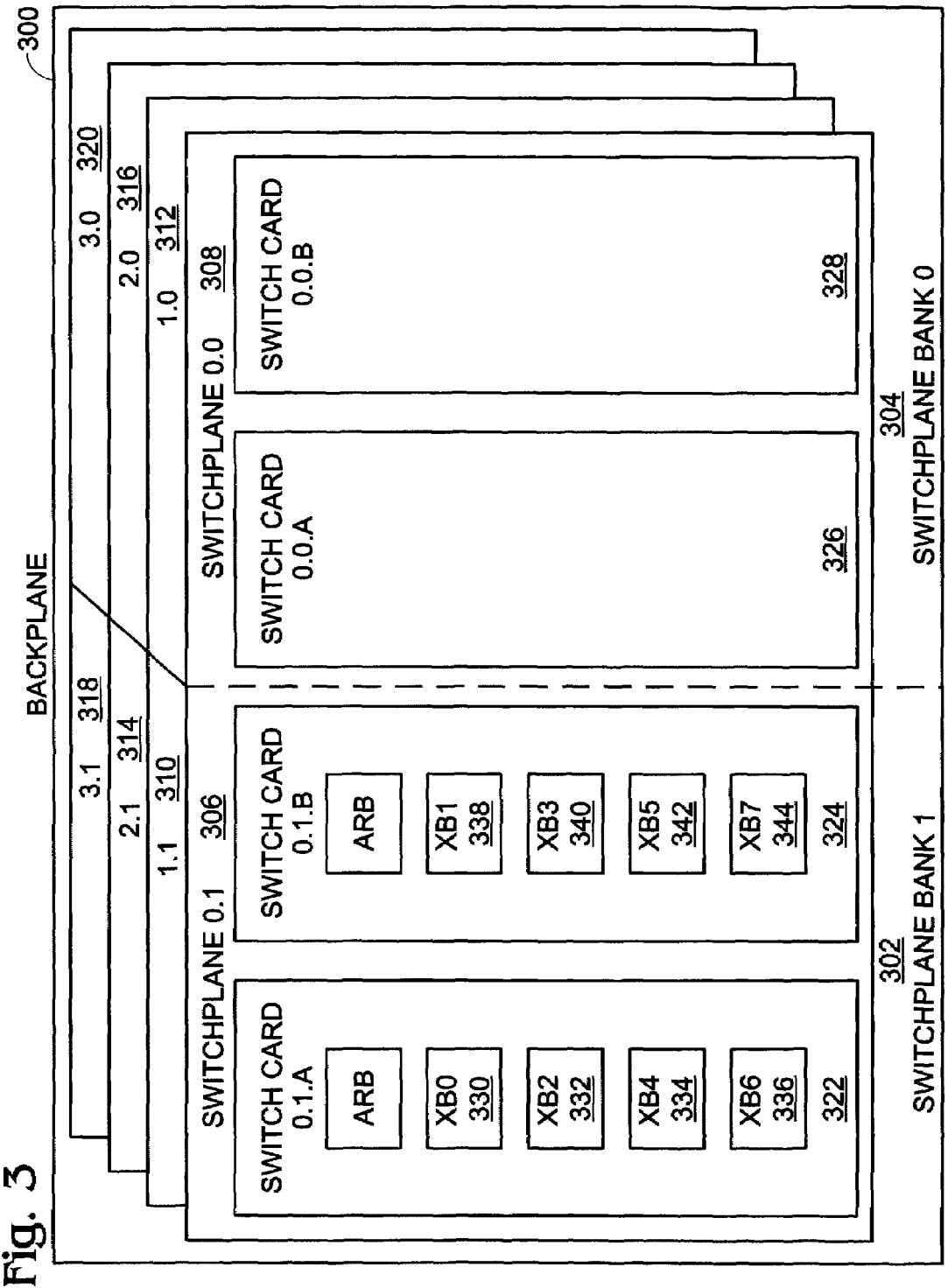
FIG. 3 is a schematic block diagram illustrating the system backplane.

FIG. 3 is a schematic block diagram illustrating the system backplane. The backplane 300 includes a fourth plurality of switchplane banks. Switchplane banks 302 and 304, but the backplane is not limited to any particular number of switchplane banks. Each switchplane bank includes a seventh plurality of switchplanes. Eight switchplanes are shown, switchplanes 306, 308, 310, 312, 314, 316, 318, and 320. There are four switchplanes for each switchplane bank, but the backplane is not limited to any particular number of switchplanes. Each switchplane includes a fifth plurality of switch cards. In this example there are two switch cards per switchplane. Switch cards 322, 324, 326, 328, are shown, but the backplane 300 is not limited to any particular number of switch cards per switchplane. Each switch card includes a third plurality of crossbars. As way of an example, crossbars (Xb) 330, 332, 334, and 336 are shown on switch card 322, and crossbars 338, 340, 342, and 344 are shown on switch card 324, but the invention is not limited to any particular number of crossbars per switch card.

Figure 4:
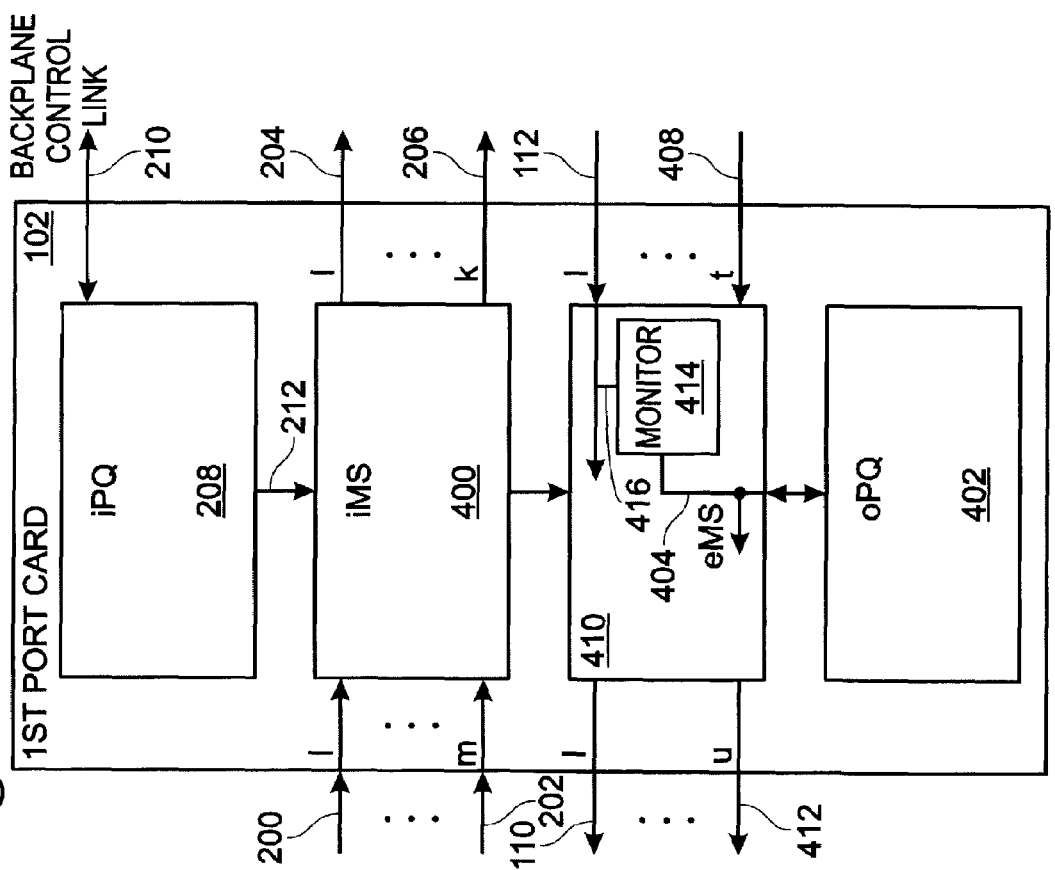
FIG. 4 is a schematic block diagram illustrating the first port card of FIG. 1 in even greater detail.

FIG. 4 is a schematic block diagram illustrating the first port card 102 of FIG. 1 in even greater detail. This detail shows that each port card may include both ingress and egress characteristics. Switch fabric backplane data link faults can occur in either the data links ingressing the crossbars or egressing the crossbars. It should be understood that the system 100 may include a first plurality of combination ingress/egress port cards, as depicted. That is, the 1 through n port cards depicted in FIG. 1 may be a first plurality (n) combination ingress/egress port cards. With respect to the ingress backplane data link faults (FIG. 4), each port card includes an ingress PQ 208 (iPQ) to reselect intra-port card connections on line 212 in response to receiving an error message on line 210 from the crossbar indicating a fault between a port card ingress backplane data links and a crossbar input.

Each port card may include an ingress memory system (iMS) 400 having inputs connected to a sixth plurality of ingress ports (1 through m) to receive packets for storage. The iMS 400 has an input on line 212 connected to the iPQ 208 to accept transfer commands, and outputs connected to a second plurality ingress backplane data links (1 through k) to supply stored packets in response to the transfer commands on line 212. The iMS stores the received packets received from ingress ports 1 through m, and can supply the stored packets to any of the 1 through k backplane data links. It is the selective connectivity between the iMS and the backplane data links that provides the system tolerance to ingress backplane data link failures.

Figure 5:
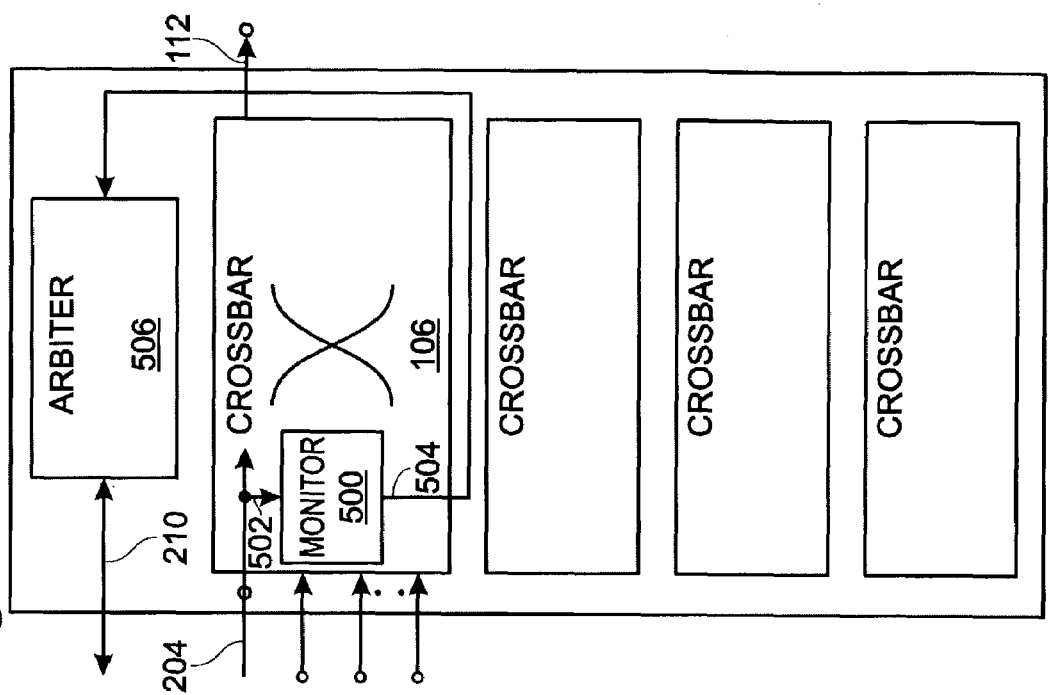
FIG. 5 is a schematic block diagram illustrating details of the crossbar of FIG. 1.

FIG. 5 is a schematic block diagram illustrating details of the crossbar 106 of FIG. 1. Each crossbar includes a monitor 500 having an input on line 502 to accept cells received on the ingress backplane data links, for example backplane data link 204, and an output on line 504 that is operatively connected to the iPQ (see reference designator 208, FIG. 4) to supply an error message in response to the received cells exceeding an error threshold. As described in more detail below, line 504 is connected to an arbiter 506. The arbiter 506 maintains backplane control link 210 with the iPQ. In some aspects of the system, the port card iMS (see reference designator 400, FIG. 4) supplies the packets in a sequence of cells coded in an 8 B/10 B algorithm and the crossbar monitor 500 decodes the received cells using the 8 B/10 B algorithm. There are many other conventional or custom coding schemes that also be used to make a determination of cells errors. The iPQ uses these error messages to determine if backplane data links are faulty.

Figure 6:
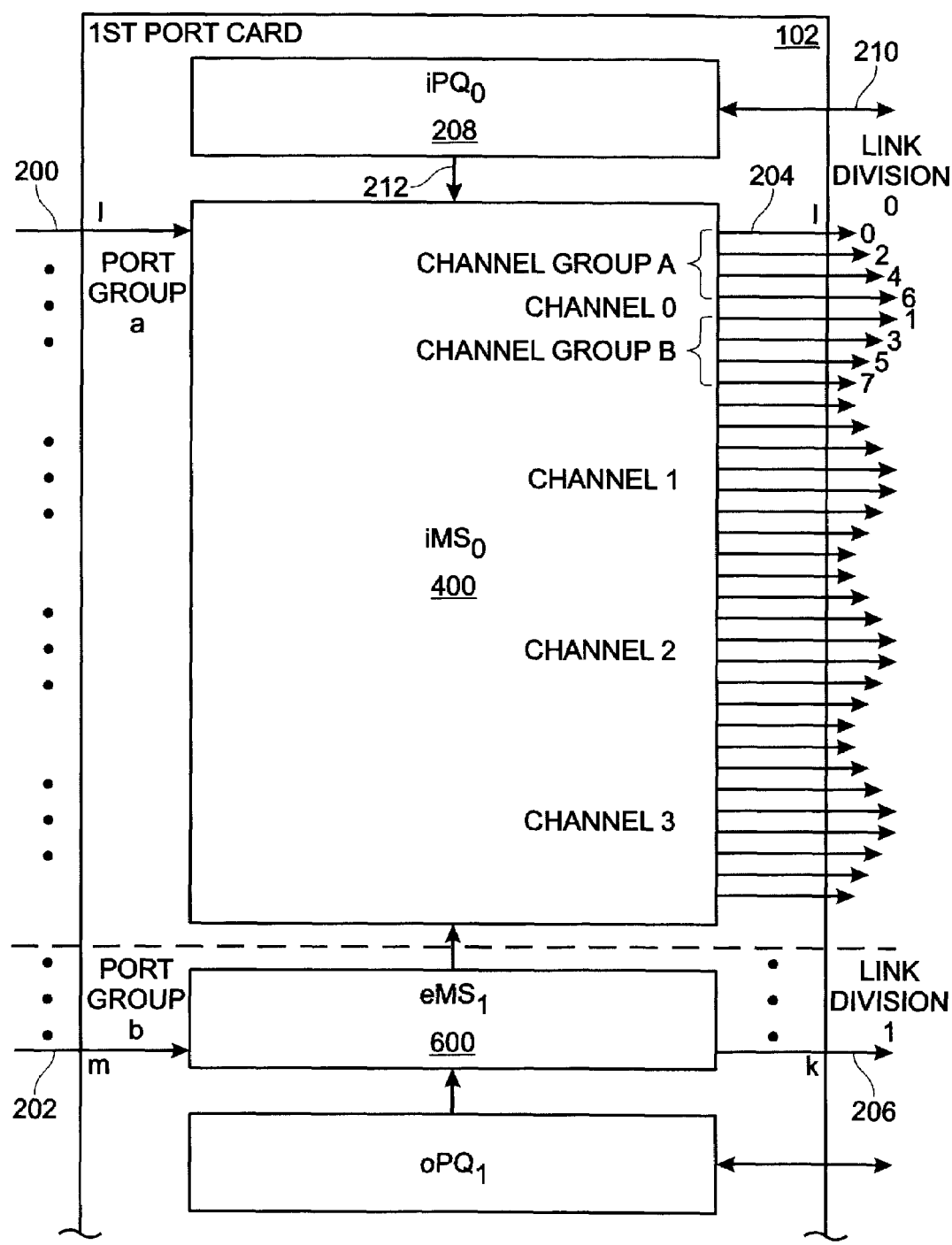
FIG. 6 is a schematic diagram illustrating in greater detail the ingress aspects of the first port card of FIG. 4.

FIG. 6 is a schematic diagram illustrating in greater detail the ingress aspects of the first port card 102 of FIG. 4. The sixth plurality of ingress ports may be separated into a fourth plurality of ingress port groups. As shown, ingress port 1 on line 200 is associated with a port group a and ingress port m on line 202 is associated with a port group b. These port groups can be further differentiated into channels, and even subchannels. However, an understanding of that additional complexity is not necessary to an understanding of the system at this level. The iMS is separated into a fourth plurality of iMSs corresponding to the fourth plurality of ingress port groups. The iMS0 400 is associated with port group a, and an iMS1 600 is associated with port group b. The iPQ is separated into a fourth plurality of iPQs corresponding to the fourth plurality of iMSs. Thus, iPQ0 208 is associated with iMS0 400 and an iPQ1 602 is associated with iMS1 600. Note that the above description implies that that the fourth plurality is equal to the value two, but the present invention is not limited to any particular fourth plurality value.

Likewise, the second plurality of backplane data links are separated into a fourth plurality of link divisions corresponding to the fourth plurality of iMSs. Thus, link division 0, including backplane data link 1 on line 204, is associated with iMS0, and link division 1, including backplane data link k on line 206, is associated with iMS1.

Each link division includes a seventh plurality of channels, each channel includes a fifth plurality of channel groups, and each channel group includes a third plurality of data links. As shown, there are 4 channels in a link division, channel 0, channel 1, channel 2, and channel 3. For link division 0, these channels would be labeled 0.0, 0.1, 0.2, and 0.3. There are 2 channel groups per channel, channel group A and channel group B. For channel 0, these channel groups would be labeled 0.A and 0.B. There are 4 backplane data links per channel group. Links 0, 2, 4, and 6 are associated with channel group A, and links 1, 3, 5, and 7 are associated with channel group B. Thus, in this example there are 32 backplane data links per link division. However, other link division/channel/channel group/data link ratios are possible.

Figure 7:
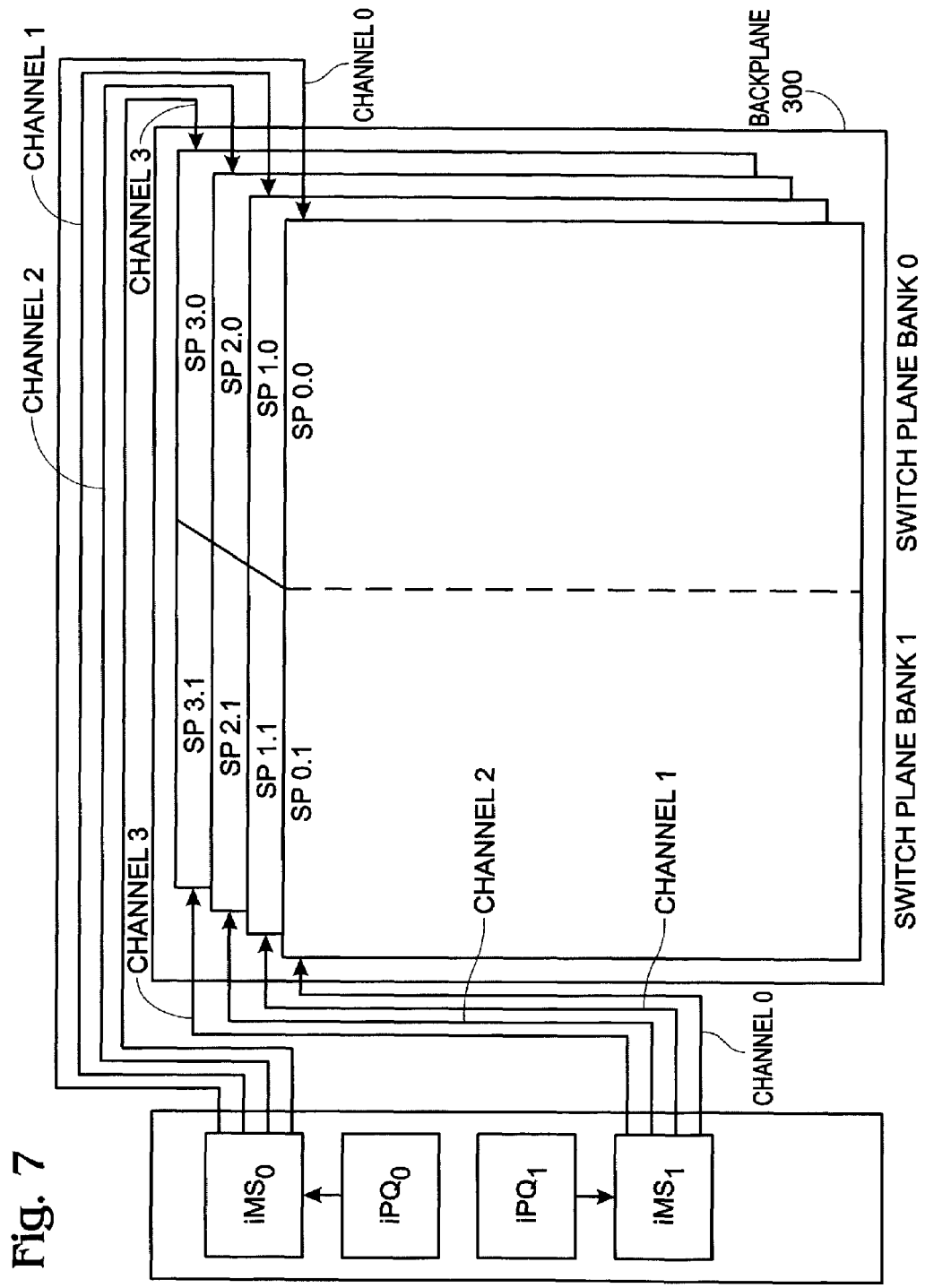
FIG. 7 is a schematic block diagram illustrating the system of FIG. 1 in greater detail.

FIG. 7 is a schematic block diagram illustrating the system 100 of FIG. 1 in greater detail. The fourth plurality of switchplane banks correspond to the fourth plurality of iPQs. For example, if the fourth plurality is equal to 2, as shown, the iPQ0 of each port card is associated with switchplane bank 0. This means that iPQ0 only makes backplane control link communications with arbiter in switchplane bank 0. This also means that the iMS0 only has backplane data links connected to switchplane bank 0. Likewise, iPQ1 and iMS1 communicate exclusively with switchplane bank 1.

The seventh plurality of switchplanes correspond to the seventh plurality of channels per link division. Thus, the four switchplanes of link division 0, switchplane 0.0, switchplane 1.0, switchplane 2.0, and switchplane 3.0, communicate with the four channels, channel 0.0, channel 0.1, channel 0.2, and channel 0.3, respectively. Likewise, the four switchplanes of link division 1, switchplane 0.1, switchplane 1.1, switchplane 2.1, and switchplane 3.1 communicate with the four channels, channel 1.0, channel 1.1, channel 1.2, and channel 1.3, respectively.

FIG. 8 is a schematic block diagram depicting switchplane 0.1, of switchplane bank 1, in greater detail, accepting backplane data links. The fifth plurality of switch cards correspond to the fifth plurality of channel groups per channel. With respect to a single channel from link division 1, channel 0 for example, channel group A is associated with switch card 0.1.A and channel group B is associated with switch card 0.1.B. The third plurality of crossbars (per switch card) correspond to the third plurality of data links per channel group. As shown, there are four crossbars per switch card corresponding to the four backplane data links per channel group. With respect to channel group A, of channel 0, of link division 1 (switch card 0.1.A), crossbar 0 communicates with backplane data link 0, crossbar 2 communicates with backplane data link 2, crossbar 4 communicates with backplane data link 4, and crossbar 6 communicates with backplane data link 6. With respect to channel group B, of channel 0, of link division 1 (switch card 0.1.B), crossbar 1 communicates with backplane data link 1, crossbar 3 communicates with backplane data link 3, crossbar 5 communicates with backplane data link 5, and crossbar 7 communicates with backplane data link 7.

It should be understood that the present example has been explained with the use of specific values to enhance the clarity of the description. However, the present invention is not necessarily limited to any of the above-mentioned particular values. In addition, there are also scalable relationships between the particular values that utilize the full potential of the system (as scaled). In one aspect of the invention, the first and sixth pluralities are a maximum number of 32 and the second plurality is a maximum value of 64. The third and seventh pluralities are a maximum value of 4, and the fourth and fifth pluralities are a maximum value of 2. Again, it should be understood that these number have been presented as an explanation of the relationship between the first through seventh pluralities, and not to limit the invention to any particular set of values. It should also be understood that the above-mentioned scalable relationship works with less than the maximum number. For example, 26 ports cards (instead of the maximum value of 32) can be used with each port card using the maximum value (32) of ports.

Returning to FIG. 4, each port card may include egress, as well as ingress, characteristics. An egress PQ 402 (oPQ) reselects intra-port card connections on line 404 in response to receiving an error message indicating a fault between a port card egress backplane data link and a crossbar output. Note that the error message is first received by an iPQ, and the iPQ relays the message to the oPQ. A second plurality of egress backplane data links 1 through t are represented with data links on lines 112 through 408, respectively. The value of t is not limited to any particular value.

An egress memory system 410 (eMS) has inputs connected to the egress backplane data links 1 through t to receive packets for storage. The eMS 410 has an input on line 404 connected to the oPQ 402 to accept transfer commands, and outputs connected to a sixth plurality of egress ports 1 through u on lines 110 and 412, respectively, to supply stored packets in response to the transfer commands. The value of u is not limited to any particular value.

The eMS 410 includes a monitor 414 having an input on line 416 to accept cells received on the backplane data links, a connection to backplane data link 112 is shown. The monitor has an output on line 404 to supply error messages to the oPQ 402 in response to the received cells exceeding an error threshold. The crossbar may supply the packets in a sequence of cells coded in an 8 B/10 B algorithm. Then, the eMS monitor 414 would decode the received cells using the 8 B/10 B algorithm.

Figure 9:
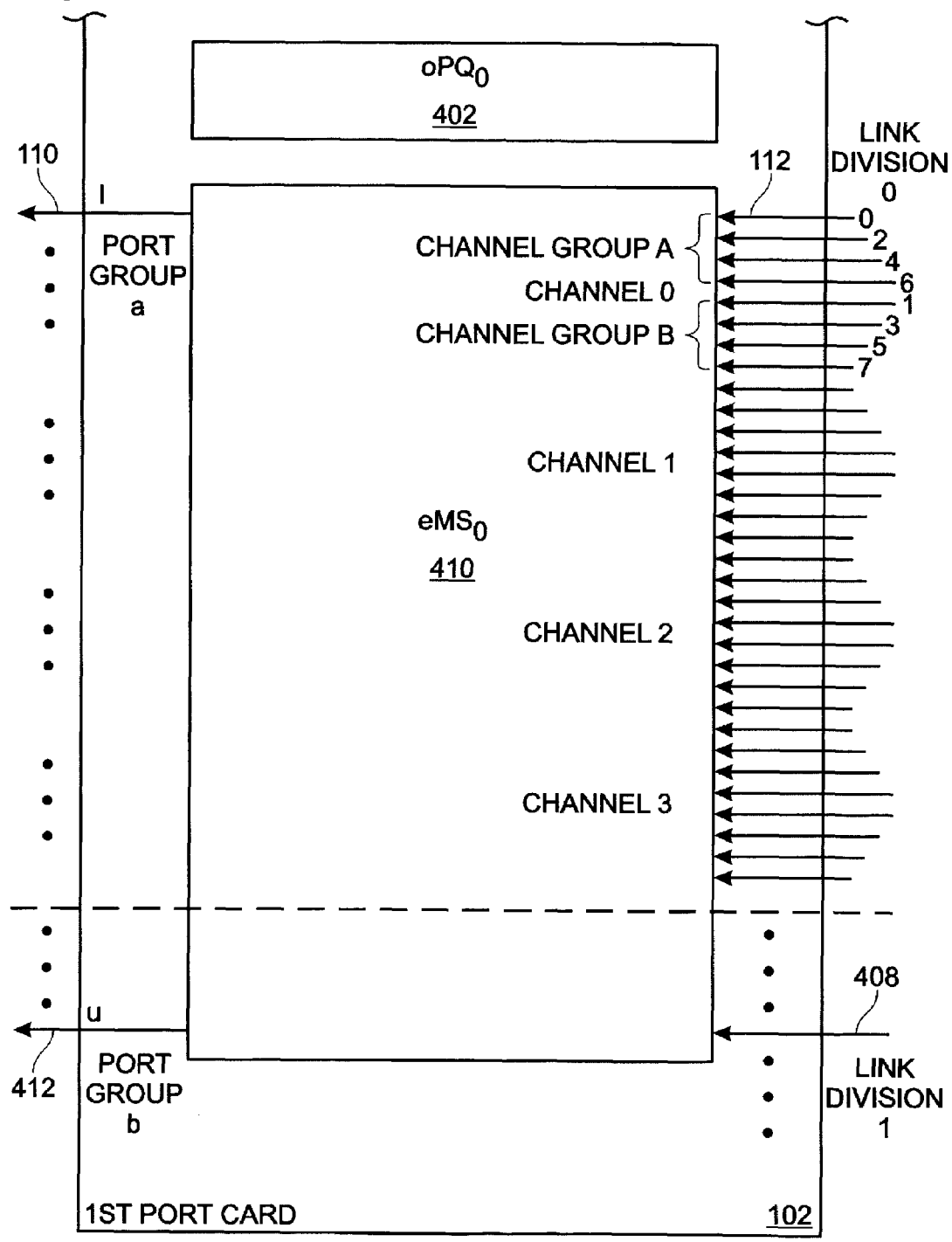
FIG. 9 is a schematic block diagram depicting the egress portion of the first port card of FIG. 4 in greater detail.

FIG. 9 is a schematic block diagram depicting the egress portion of the first port card 102 of FIG. 4 in greater detail. This explanation roughly parallels the description of the ingress portion of the port card. The sixth plurality of egress ports 1 through u are separated into a fourth plurality of egress port groups. As shown, the fourth plurality is represented by port group a and port group b. Although there is only a single eMS, in some aspects of the system, a fourth plurality of FIFO memory subsystems (fMSs) (not shown) organize the backplane data link traffic flow from the crossbar outputs to the eMS. However, this level of detail need not be shown to appreciate the invention. Likewise, a single oPQ exists, managing the single eMSs.

The second plurality of backplane data links are separated into a fourth plurality of link divisions corresponding to the fourth plurality of fMSs (not shown). Shown are link division 0 and link division 1. Each link division includes a seventh plurality of channels. As shown for link division 0, there are four channels, channel 0, channel 1, channel 2, and channel 3. Each channel includes a fifth plurality of channel groups. As shown, channel 0 includes two channel groups, channel group A and channel group B. Each channel group includes a third plurality of data links. As shown, channel group A includes four backplane data links, data link 0, data link 2, data link 4, and data link 6.

Figure 10:
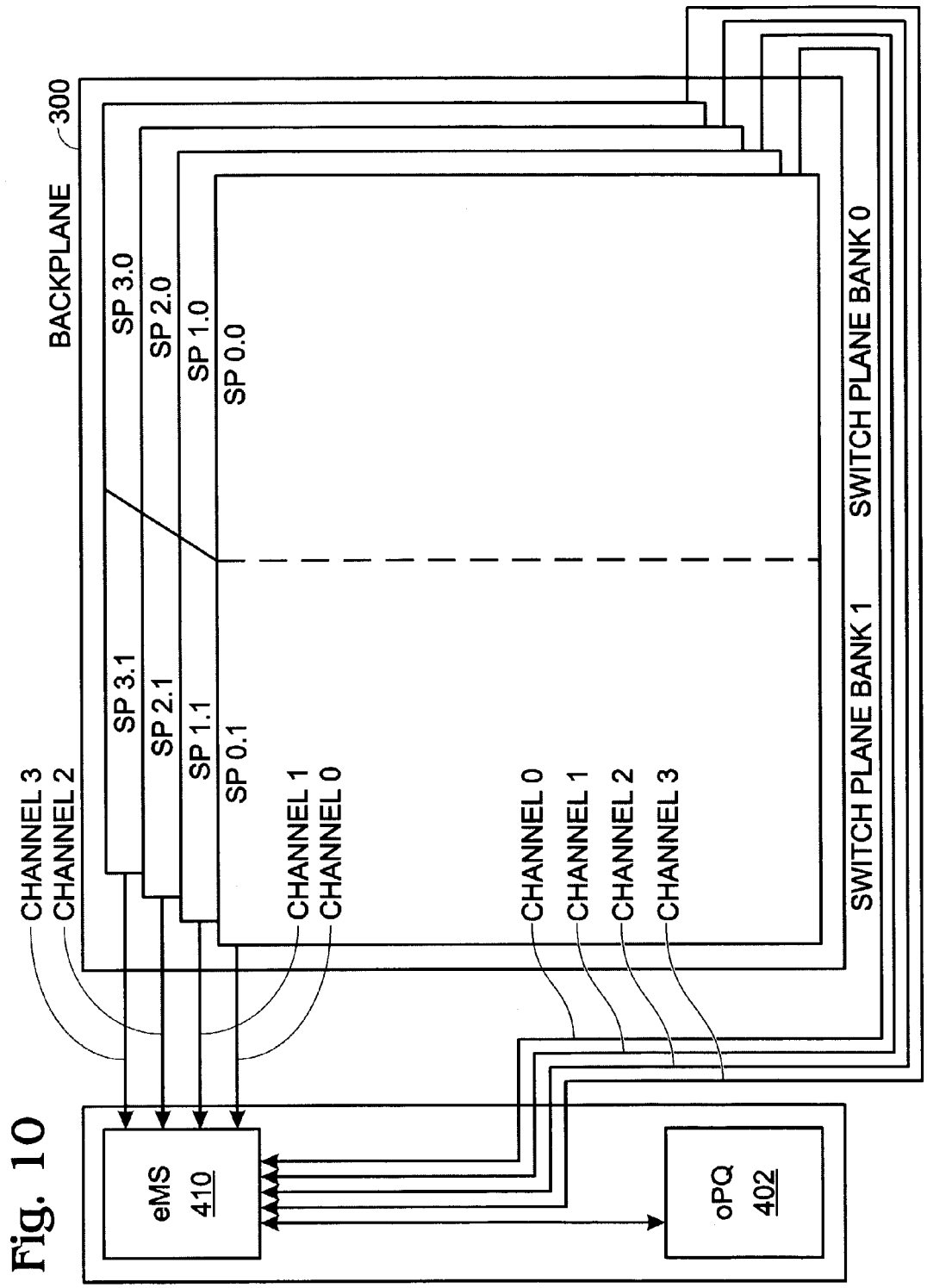
FIG. 10 is a schematic block diagram illustrating the egress portion of the system of FIG. 1 in greater detail.

FIG. 10 is a schematic block diagram illustrating the egress portion of the system 100 of FIG. 1 in greater detail. As with the ingress portion depicted in FIG. 7, the fourth plurality of switchplane banks correspond to the fourth plurality of link divisions. Thus, the backplane data links of link division 0 communicate with switchplane bank 0, and the backplane data links of link division 1 communicate with switchplane bank 1. The seventh plurality of switchplanes correspond to the seventh plurality of channels. Using link division 0 as an example, channel 0 communicates with switchplane 0 of switchplane bank 1 (SP 0.1), channel 1 communicates with SP 1.1, channel 2 communicates with SP 2.1, and channel 3 communicates with SP 3.1.

FIG. 11 is a schematic block diagram depicting switchplane 0.1, of switchplane bank 1, in greater detail, supplying backplane data links. The fifth plurality of switch cards correspond to the fifth plurality of channel groups per channel. With respect to a single channel from link division 1, channel 0 for example, channel group A is associated with switch card 0.1.A and channel group B is associated with switch card 0.1.B. The third plurality of crossbars (per switch card) correspond to the third plurality of data links per channel group. As shown, there are four crossbars per switch card corresponding to the four backplane data links per channel group. With respect to channel group A, of channel 0, of link division 1 (switch card 0.1.A), crossbar 0 communicates with backplane data link 0, crossbar 2 communicates with backplane data link 2, crossbar 4 communicates with backplane data link 4, and crossbar 6 communicates with backplane data link 6. With respect to channel group B, of channel 0, of link division 1 (switch card 0.1.B), crossbar 1 communicates with backplane data link 1, crossbar 3 communicates with backplane data link 3, crossbar 5 communicates with backplane data link 5, and crossbar 7 communicates with backplane data link 7.

It should be understood that the present invention is not necessarily limited to any of the above-mentioned particular values. In addition, there are also scalable relationships between the particular values that utilize the full potential of the system (as scaled). In one aspect of the invention, the first and sixth pluralities are a maximum number of 32 and the second plurality is a maximum value of 64. The third and seventh pluralities are a maximum value of 4, and the fourth and fifth pluralities are a maximum value of 2. Again, it should be understood that these number have been presented as an explanation of the relationship between the first through seventh pluralities, and not to limit the invention to any particular set of values. It should also be understood that the above-mentioned scalable relationship works with less than the maximum number.

FUNCTIONAL DESCRIPTION

The Applied Micro Circuits Corporation (AMCC) S8005 Cyclone™ series is a specific embodiment of the above-described present invention series. The Cyclone series is a highly integrated, low power, area efficient chip set that implements a high-capacity switching fabric that seamlessly handles both packet and TDM (time division multiplexed) traffic. Details of this specific embodiment are presented below to clarify some of the system aspects described above. The switch fabric processes all types of packet traffic (ATM, MPLS, IP, etc.). The system switch fabric is based on a set of four highly integrated ICs which contain SERDES and memory in order to reduce the overall system power, routing complexity, and required board area. The chip set consists of the following chips:

S8505 Priority Queue (PQ);
S8605 Arbiter/Crossbar;
S8805 Earliest Deadline First Queue (EDFQ); and,
S8905 Memory Subsystem (MS).

The port cards described above could be a single device including the PQ, MS, and EDFQ chip functions.

The Cyclone switch fabric implementation is "protocol agnostic," meaning the chips can process all types of packet traffic (Fibre Channel, ATM, MPLS, IPv4, IPv6, etc.) equally well. The focus of the Cyclone system is to optimize switching performance in terms of throughput, latency, switch capacity, and scalability.

Generally, the Cyclone fabric does not use striping. It does support a striped cell format (ViX-v3) when used in conjunction with certain traffic managers. However, even when the Cyclone fabric used ViX-v3 packets at the ingress or egress, the routing of the packets through the crossbars is still done along a single link per packet.

Cyclone solves the problems associated with ATM and Frame Relay by using fixed frame size (64 byte or 80 byte cells, constant for each switch fabric). For extremely low latency voice applications, such as voice over IP (VoIP), packets consist of one or two cells. For high speed data communications, packet sizes can be as large as 192 cells (15,360 bytes if 80-byte cells are used). In either case, the fixed cell size allows the fabric to be fast. Because the Cyclone solution is "cut-through", latency is kept to an absolute minimum.

The Cyclone method of cut-through packet routing minimizes latency. Service providers have delay budgets and often need to be able to offer very low latency to certain customers. A store-and-forward approach simply would not meet these needs. The only downside to cut-through switching is it places the additional burden of packet integrity checking on the traffic managers. This is usually handled by means of a cyclic redundancy check (CRC). The iTM calculates the required CRC byte(s) based on the data in a packet. The CRC is recalculated by the eTM to verify correct transmission.

The arbitrated crossbar method, used in the Cyclone system, is more complicated because it requires a centralized arbitration mechanism. But this method allows better scaling of the switch fabric from a small 20 Gbit/sec fabric to a large 1.2 Gbit/sec system.

Figure 12:
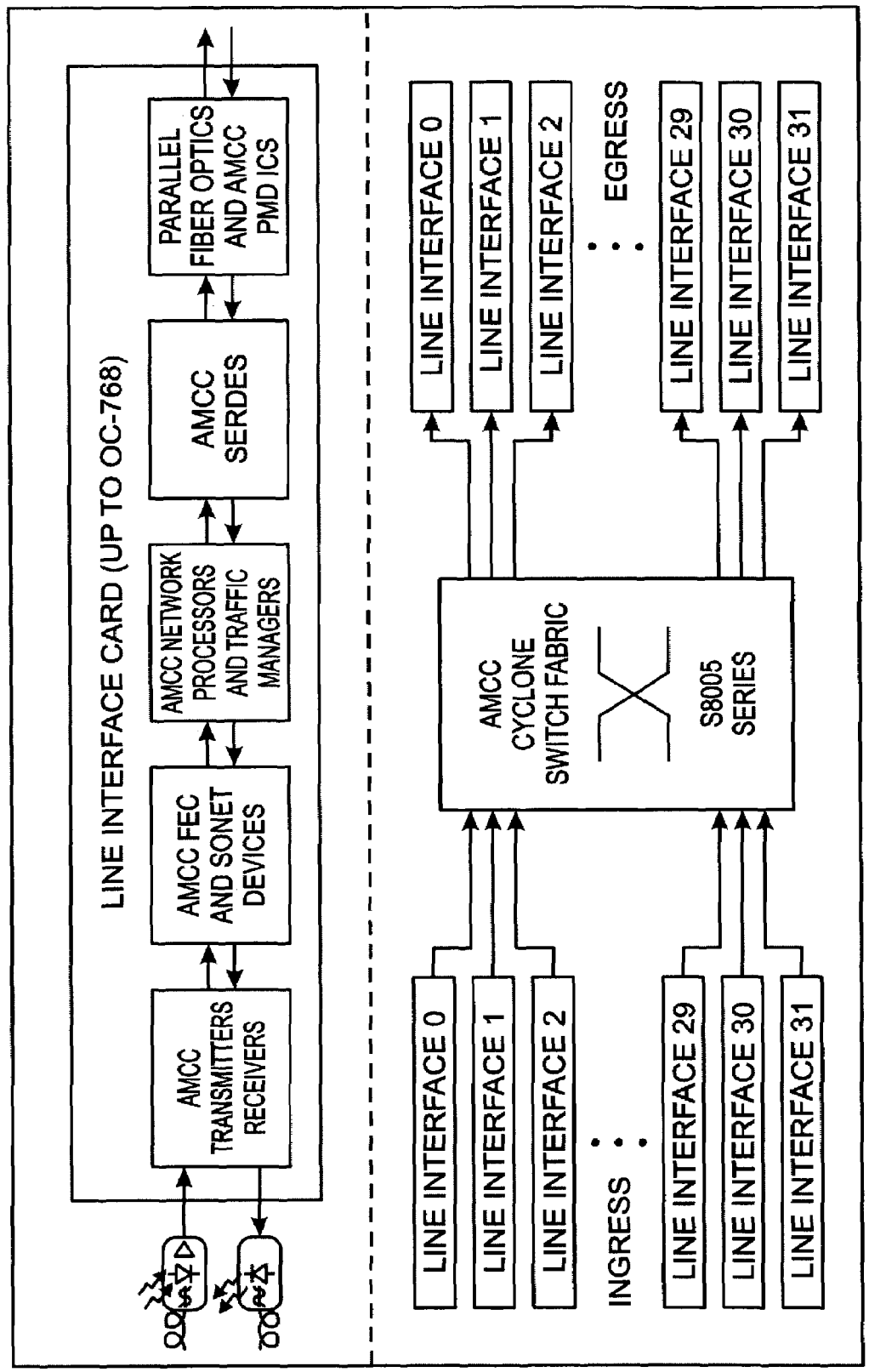
FIG. 12 is a schematic block diagram depicting a packet communications network utilizing the present invention switch fabric.

FIG. 12 is a schematic block diagram depicting a packet communications network utilizing the present invention switch fabric. Traffic management is integrated into the switch fabric and occurs at the ingress, switching, and egress in order to guarantee quality of service (QoS). The switch fabric is scalable and can terminate up to 128 OC-192's (1.28 Tbps). The system can be organized as a 32×32 port switch where each port consists of four OC-192 channels, in effect implementing a 128×128 switch. The OC-192's can be either channelized or concatenated. The fabric can also be thought of as a 512×512 switch since each channel can be treated as four OC-48 subchannels. In addition to the port cards, there are up to 16 switching cards (depending on the chosen architecture and organization), which consist of arbiters and crossbars. Each switching card has connections to all the port cards.

All traffic is cellularized, whether TDM or best-effort type traffic. The interface into and out of the switch fabric passes cells over 2.5 Gbps serial links, which include 8 B/10 B encoding. Each channel of the switch fabric consists of up to ten serial links, providing up to 20 Gbps data rate throughput.

Port cards provide the traffic interface into the switch fabric. Port cards can be architected such that the line interface (optics, Phy.'s, framers), network processing, and traffic management are on the same card, or they can be architected to be on separate cards. A port card's configuration is dependent on the desired chassis architecture and the number of chips needed.

The three basic types of port cards are single channel (10 G or OC-192), two channel (20 G or 2×OC-192), and four channel (40 G or 4×OC-192). The different types of port cards are normally not mixed in the same chassis because the backplane and switch cards would have to be built to support the largest case. When all of the cards are of the same type, there are optimizations that can be done (depending on the required bandwidth), to reduce the number of switch cards or crossbars on those cards, and hence the number of traces on the backplane.

Figure 13:
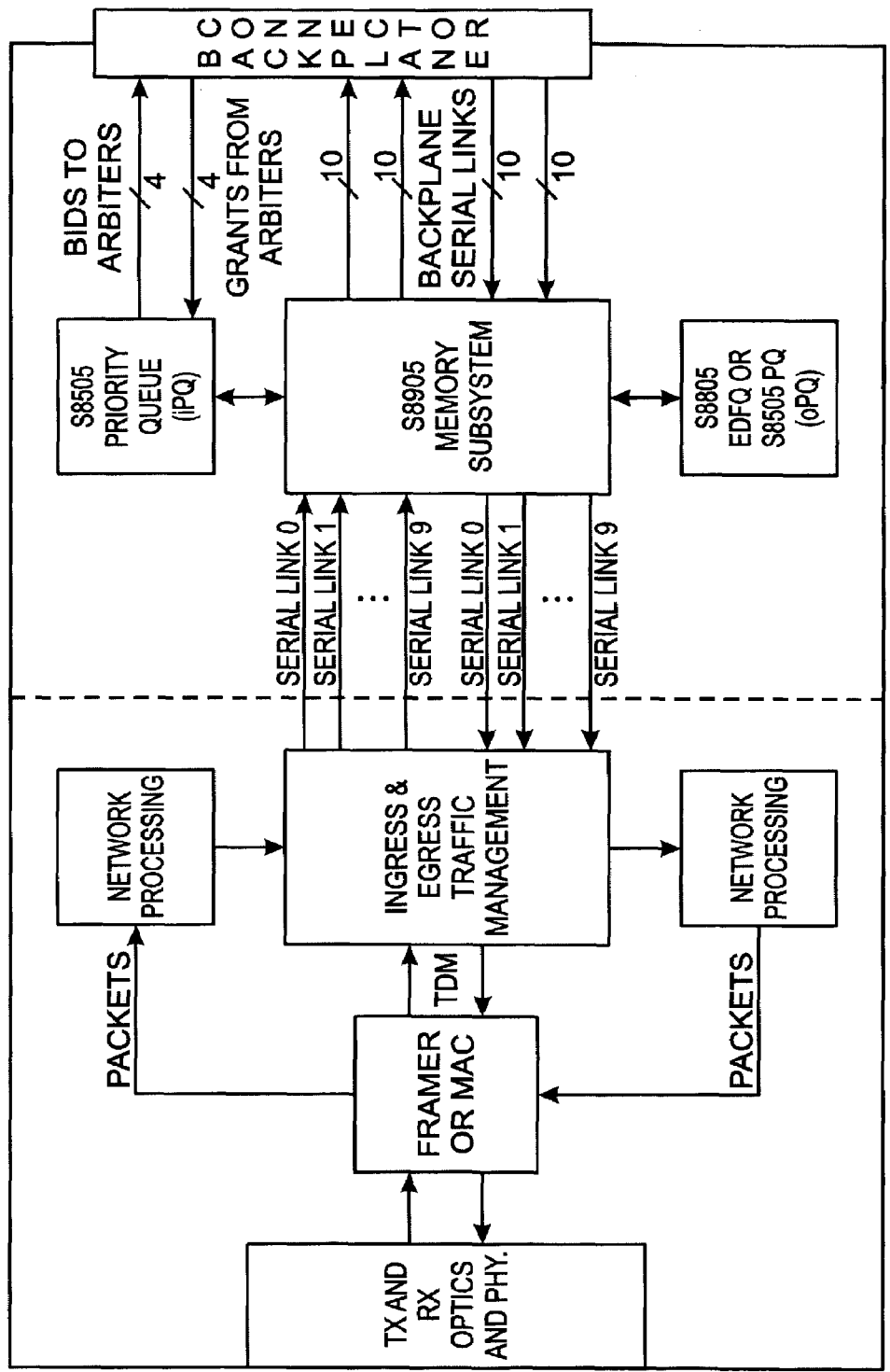
FIG. 13 is a schematic block diagram depicting an example of a single channel port card with all the necessary line functions on a single card.

FIG. 13 is a schematic block diagram depicting an example of a single channel port card with all the necessary line functions on a single card. Packet or best-effort traffic travels through the network processor (NP) and ingress traffic manager (TM) before being sent to the fabric. TDM traffic goes directly from the framer to the TM if it can handle TDM traffic, otherwise it goes to a cellification device, which would then interface to the TDM provisioned links. 10 links are being used on the line ingress and line egress sides of the Memory Subsystem (MS). Having 10 links implies the use of 80-byte Cyclone cells; only 8 links can be used when using a 64-byte cell size. The system description of FIGS. 1 through 12, above, is based upon the use of a 64-byte cell. However, as presented below, the same system elements and processes are used for managing 80-byte cells. The 8 and 10 links represent the maximum number of links that can be used for their respective cell sizes. There is nothing preventing the use of fewer links if they are all that is needed.

The ratio between the number of line ingress links and the number of links carrying data to the backplane gives the backplane speedup for the system. In this example, there are 10 ingress links into the MS and 20 links (2 backplane channels) carrying that data to the backplane. This gives a backplane speedup of 2×. As another example, with 8 ingress links and 12 backplane links, there is a speedup of 1.5×. It should be noted that in addition to the backplane speedup, there is also an ingress/egress speedup. With 10 ingress links capable of carrying 2 Gbps each of raw data, this presents a 20 Gbps interface to the MS. An OC-192 only has approximately 10 Gbps worth of data. Taking into account cell overhead and cell quantization inefficiencies, there still remains excess capacity in the links.

The S8505 iPQ shown in FIG. 13 has all 4 bid and grant links shown. In a 32×32 system with all the cards being single channel cards (320 Gbps), only 4 of the links would need to be used, as described in detail below.

Figure 14:
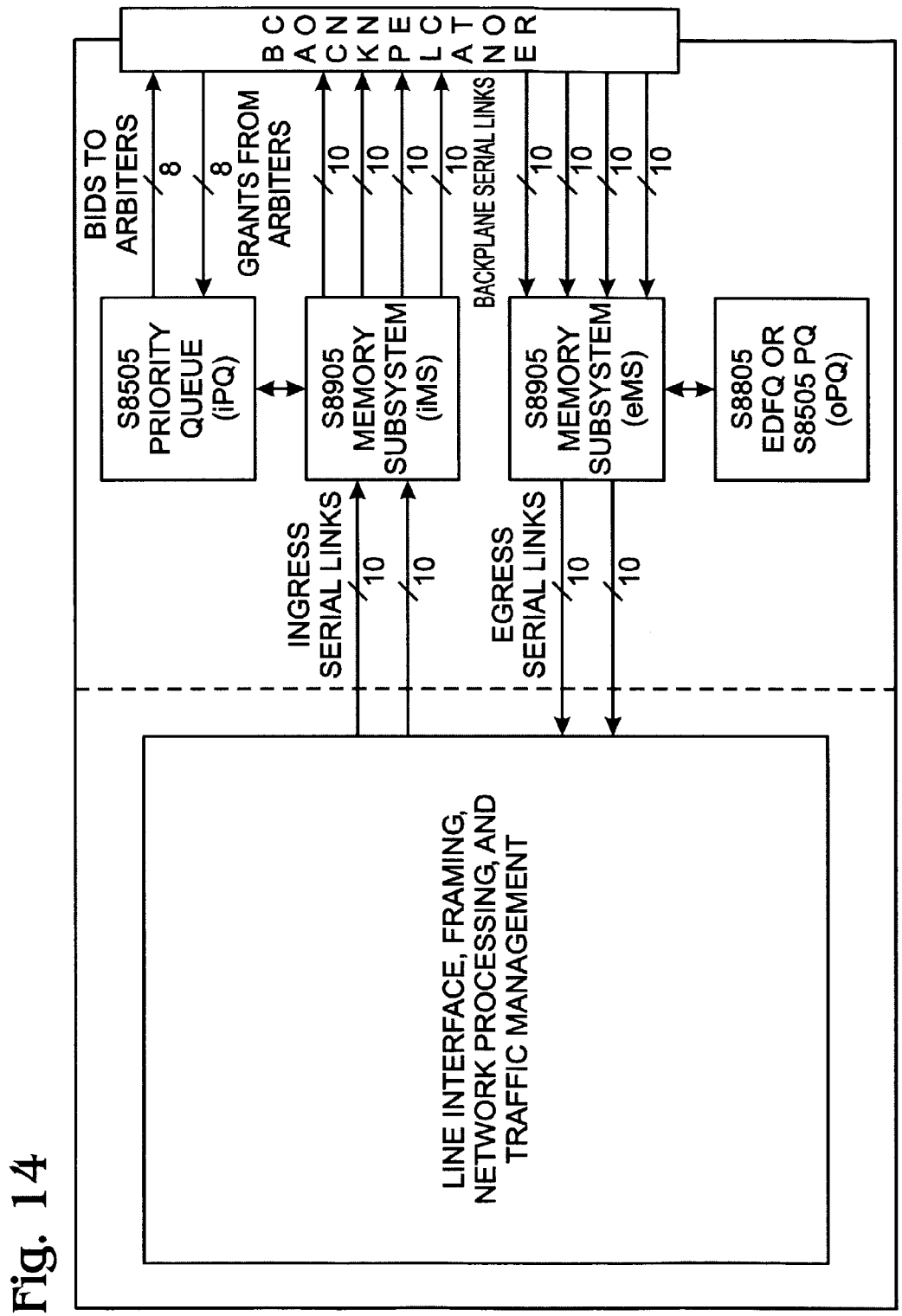
FIG. 14 is a schematic block diagram exemplifying a 2-channel port card.

FIG. 14 is a schematic block diagram exemplifying a 2-channel port card. The only difference between the previous example and this one is the addition of an extra MS. In the single-channel case, one MS takes care of both ingress and egress buffering. In the two-channel case, an additional MS is required in order to provide the number of serial links necessary to function and still have a speedup. Note that the single-channel card can be used as a two-channel card by enabling 10 more ingress and egress links, but there would be no backplane links left to create a speedup.

Just as in the single-channel case, the number of usable links is related to the cell size, and the number used can always be less than the total allowed for that cell size. If the two-channel card of FIG. 14 were used in a 32×32 system (640 Gbps) where all the cards were the same, then all eight links on the PQ would be required for bids and grants. If a 16×16 system of these cards (320 Gbps) were created, then only 4 of the PQ links would be necessary.

Figure 15:
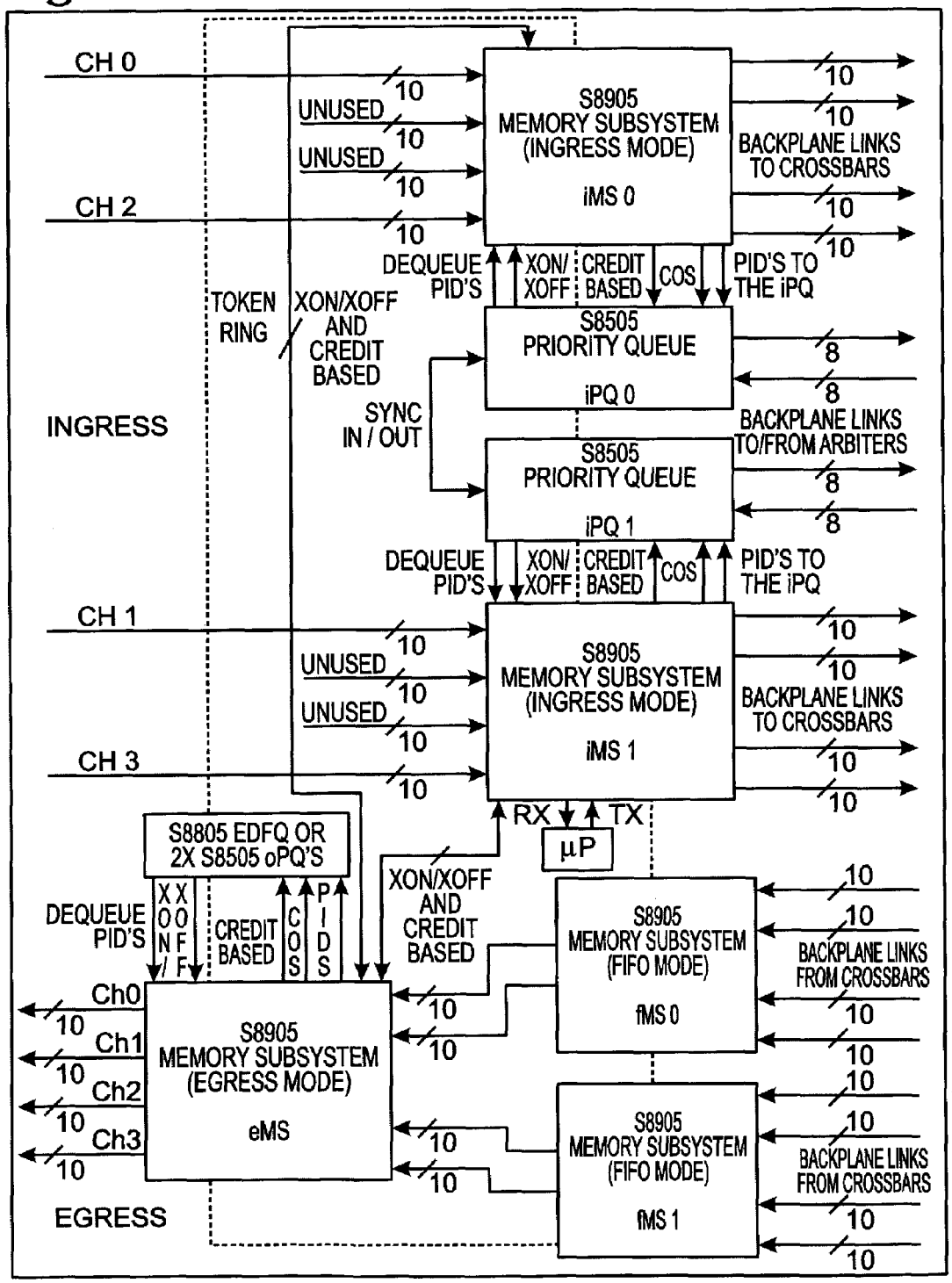
FIG. 15 is a schematic block diagram depicting an example architecture of a 4 channel (OC-768) port card.

FIG. 15 is a schematic block diagram depicting an example architecture of a 4-channel (OC-768) port card. The configuration shown is different than the previous ones shown (FIGS. 13 and 14) in terms of chip counts and functional partitioning. To begin with, instead of having the line interfaces, framers, network processors, and traffic management on the port card, there is a connector. The connector is used because of size constraints, or to customize the system. For instance, it may be desirable to have one channel be fibre channel, the second be 10 Gb Ethernet, the third SONET, and the fourth MPLS.

The number of chips required to support 4 channels is also larger. As shown in the two-channel port card (FIG. 14), it requires an entire MS to support two ingress channels and still have backplane speedup, so in the 4-channel case it is logical that another MS and PQ would be required. It should be noted that the odd ingress channels are defined on one MS and the even channels on the other. This is done for memory access reasons and also has to do with how links are serviced. The first link that is serviced is in channel 0, 8 ns later a link in channel 1 is serviced, 8 ns after that a link in channel 2 is serviced, followed by a link in channel 3, 8 ns later. Then, 8 ns later the next link in line from channel 0 is serviced (32 ns after the previous link from channel 0 was serviced). This process continues, and does not return to the starting link in channel 0 until all the links have been serviced.

Similar to the previously described port cards, the maximum number of links per channel is set according to the cell size, but fewer links can always be used. The number of links used by each channel does not have to be symmetric. This may be desirable in order to decrease the number of traces, but the time slots allocated to pass data through those links will still be reserved. Since there are now two PQs in the system, there are a total of 16 links that can be used for bids and grants. In a 32×32 system where all the cards are 4 channels (1.28 Tbps), all 16 links would be necessary. In a 16×16 4-channel system (640 Gbps), only half as many would be required, 4 per PQ.

The egress side of the 4-channel port card has 3 MSs. A 2× backplane speedup with 4 channels requires 80 links entering the egress side. To terminate 80 links requires 2 MSs, since each MS has 40 links. These two MSs (fNSs) send the traffic to the third MS (eMS) in FIFO order. Scheduling cannot be performed at this point since the scheduler has to be aware of the packets in both MSs. For this reason, and to provide channel multicast, all the traffic must be funneled into a single MS. This removes the backplane speedup and presents a standard 4-channel interface to the egress traffic manager.

Figure 16:
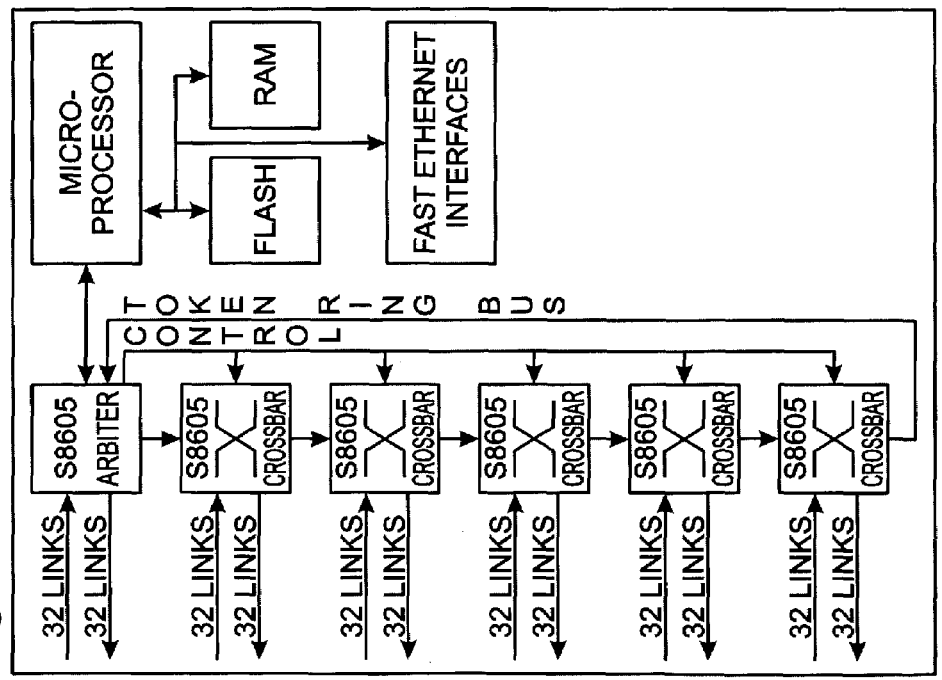
FIG. 16 is a schematic block diagram depicting a switch card.

FIG. 16 is a schematic block diagram depicting a switch card. Switch cards are responsible for connecting the different port cards together to deliver traffic from ingress to egress. The arbiter on the switch card performs a maximal matching algorithm that establishes as many backplane connections as possible to maintain the highest throughput. Each switch card acts independently to service the links attached to it.

A switch card typically has a single arbiter and a number of crossbars. An arbiter can control a maximum of five crossbars. Through the arbiter, a microprocessor can access the crossbar and arbiter registers as well as all the Cyclone chips on all the port cards.

Figure 17:
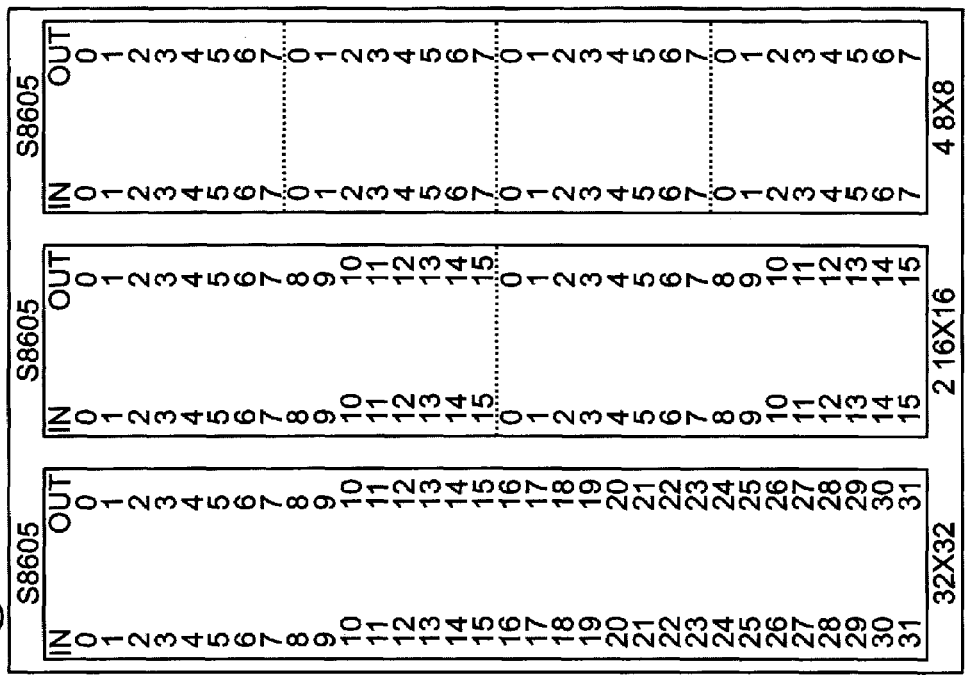
FIG. 17 is diagram illustrating different crossbar configurations.

FIG. 17 is diagram illustrating different crossbar configurations. A fully populated 32×32 port card system can include up to 16 switch cards. The number of crossbars required on a switch card is dependent on the number of links being output by a channel on the backplane (or the backplane speedup). For example, if a backplane channel (no relation to input channels) has 10 links, then 10 crossbars would be required to service it. Links attachments to the switch cards are dependent upon the number of port cards in a system and the arbiter configuration. The arbiter can be configured to treat each of the crossbars as 4 8×8 crossbars, 2 16×16 crossbars, or a single 32×32 crossbar as shown in FIG. 17. The arbiter mode, and hence the crossbar treatment, is dependent on the maximum number of port cards in the switch fabric.

The PQ device may include 1024 queues. These queues are grouped together to create up to 8 class of service (COS) queues which when taken together form virtual output queues (VOQs). The number of queues available for creating different COS levels is dependent on the output port granularity and the number of port cards in the system. For example, if the number of port cards in a system is 32, with 4 egress channels per port card, there would be 1024/(4×32)=8 COS queues available for each VOQ. Taking the same case but using 4 subchannels per channel, there would only be 2 COS queues available for each VOQ. However, if the number of cards were reduced to 16, then there would be 4 COS queues for each VOQ. The equation to calculate how many COS queues are available is summarized as:

Available # of COS queues per VOQ=(Total # of queues)/(# of Port Cards×# of Channels×# of Subchannels).

The number of COS's per VOQ can never be greater than eight.

FIG. 18 is a diagram illustrating link to channel assignments. The MS provides the interface between the line side and the fabric. As mentioned previously, the ratio between the number of backplane links used and the number of ingress/egress links used sets the speedup of the fabric. Each MS has 40 input/output data links which can be used. Every 10 links create a channel, whether it is a backplane channel or an ingress/egress channel. There is no logical relationship between backplane and ingress/egress channels. A packet that arrives on one link can, in general, leave on any other link.

The number of links used in a channel is programmable. Unused links are powered down for power savings. The maximum number of links that can be used in a channel is based on the chosen cell size. When 80-byte cells are used, up to 10 links can be used. When 64-byte cells are being used, only up to 8 links can be used. The unused links would be the ones shown below the dashed lines (the 8th and 9th link of each channel) in FIG. 18.

An 8-10 link channel can be used to transport an OC-192 worth of data traffic. A channel can also be treated as a group of OC-48 subchannels. When subchannels are enabled, the link to subchannel mapping would be organized as shown in Table 1. This organization would repeat for all the ingress/egress channels. The links of a channel are serviced in round robin order starting at link 0. In general, the time between links is 32 ns. Note that a backplane channel, regardless of whether the ingress/egress channels have subchannels enabled, is always treated as a channel sized entity.

TABLE I

MS Link to Subchannel Mapping for Ingress/Egress Channels using Cyclone Native Cell Format

| Physical Link# | Subchannel # | Subchannel Link# |
|---|---|---|
| 0 (10) (20) (30) | Subchannel 0 | 0 |
| 1 (11) (21) (31) | Subchannel 1 | 0 |
| 2 (12) (22) (32) | Subchannel 2 | 0 |
| 3 (13) (23) (33) | Subchannel 3 | 0 |
| 4 (14) (24) (34) | Subchannel 0 | 1 |
| 5 (15) (25) (35) | Subchannel 1 | 1 |
| 6 (16) (26) (36) | Subchannel 2 | 1 |
| 7 (17) (27) (37) | Subchannel 3 | 1 |
| 8 (18) (28) (38) | Subchannel 0 | 2 |
| 9 (19) (29) (39) | Subchannel 1 | 2 |

Since all links must be serviced in one cell time, it is easy to see why more links can be serviced when a longer cell is used. A 64-byte cell takes 256 ns to be received at 2.5 Gbps. (256 ns)/(32 ns/link) gives enough time for 8 links. An 80-byte cell takes 320 ns to be received at 2.5 Gbps. (320 ns)/(32 ns/link) gives enough time for 10 links. For 64-byte cells, links 8 and 9 of each channel shown in Table 1 would not be used.

Table 2 and Table 3 show ViX-v3 cell format mappings, which are for 64-byte cells only. Since ViX-v3 cells are striped across 2 or 8 links, each cell takes 128 ns for the OC-48 cell format or 32 ns for the OC-192 cell format.

TABLE 2

MS Link to Subchannel Mapping for Ingress/Egress Channels using ViX-v3 OC-48 Cell Format

| Physical Link# | Subchannel # | Subchannel Link# |
|---|---|---|
| 0 (10) (20) (30) | Subchannel 0 | 0 |
| 1 (11) (21) (31) | Subchannel 0 | 1 |
| 2 (12) (22) (32) | Subchannel 1 | 0 |
| 3 (13) (23) (33) | Subchannel 1 | 1 |
| 4 (14) (24) (34) | Subchannel 2 | 0 |
| 5 (15) (25) (35) | Subchannel 2 | 1 |
| 6 (16) (26) (36) | Subchannel 3 | 0 |
| 7 (17) (27) (37) | Subchannel 3 | 1 |
| 8 (18) (28) (38) | N/A | N/A |
| 9 (19) (29) (39) | N/A | N/A |

TABLE 3

MS Link to Subchannel Mapping for Ingress/Egress Channels using ViX-v3 OC-192 Cell Format

| Physical Link# | Subchannel # | Subchannel Link# |
|---|---|---|
| 0 (10) (20) (30) | Subchannel 0 | 0 |
| 1 (11) (21) (31) | Subchannel 0 | 1 |
| 2 (12) (22) (32) | Subchannel 0 | 2 |
| 3 (13) (23) (33) | Subchannel 0 | 3 |
| 4 (14) (24) (34) | Subchannel 0 | 4 |
| 5 (15) (25) (35) | Subchannel 0 | 5 |
| 6 (16) (26) (36) | Subchannel 0 | 6 |
| 7 (17) (27) (37) | Subchannel 0 | 7 |
| 8 (18) (28) (38) | N/A | N/A |
| 9 (19) (29) (39) | N/A | N/A |

Switch Planes

Figure 20:
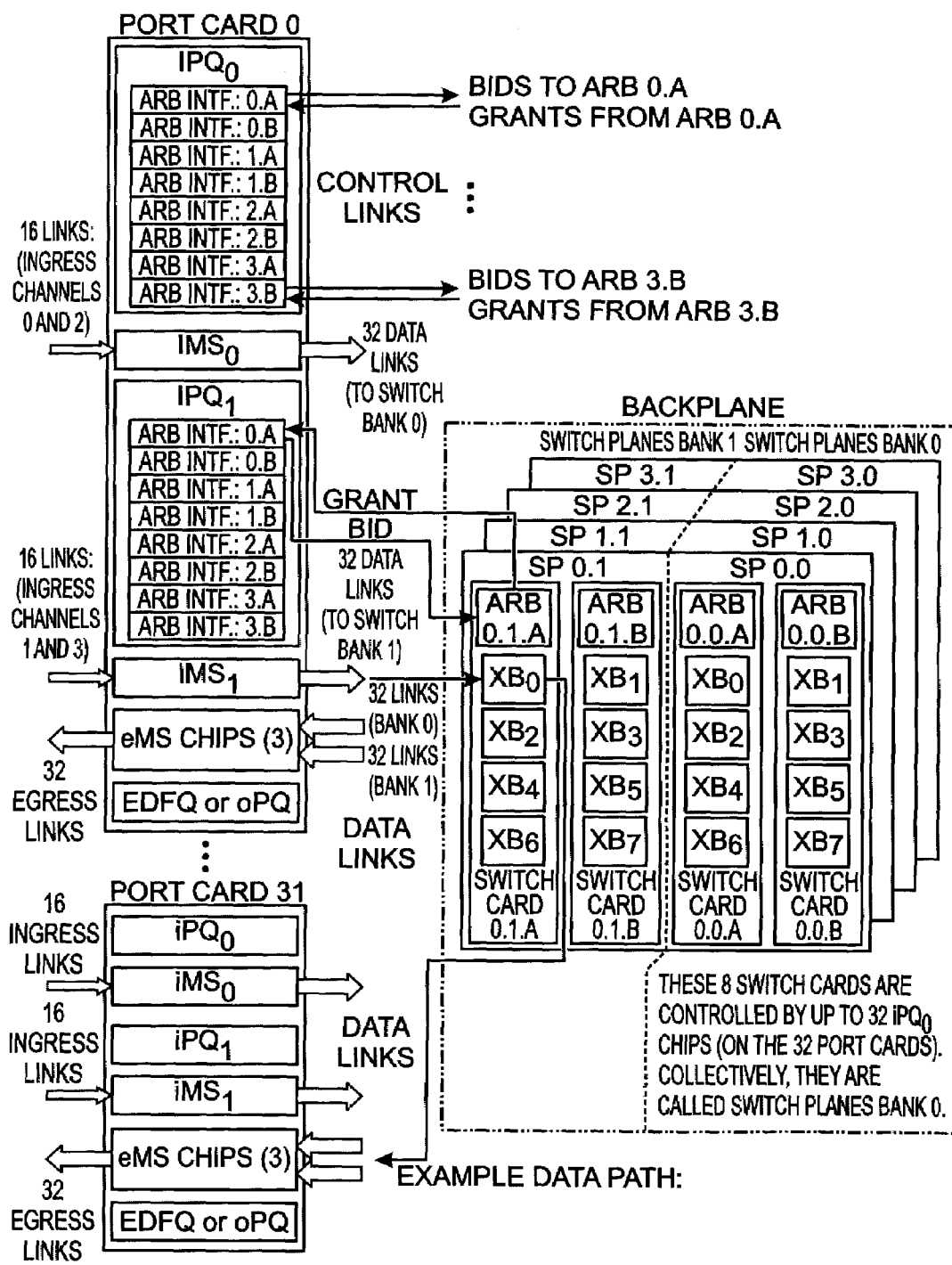
FIG. 20 is a schematic block diagram depicting the switch fabric backplane.

Two switch cards, that together service a backplane channel, form a switch plane. A backplane channel, as defined in the previous subsection, consists of a group of backplane data links from the MS that carry traffic to the same switch plane. The timing of the links in a backplane channel is such that one link is serviced in the channel every 32 ns with all the links in that channel getting serviced in one cell time. In a fully provisioned 32×32 port card system, there would be 32 4-channel port cards and 16 switch cards forming 2 banks of 4 switchplanes as shown in FIG. 20.

The entity that makes two switch cards function together as a switch plane to service a backplane channel is the iPQ. The association between a switchplane and (two) switch cards is determined by the particular association of arbiter and iPQ. The association between switchplane bank and switchplane is determined by the iPQ connected to the switchplane. An iPQ communicates only with the arbiter on a switch card. The arbiter is then responsible for configuring the crossbars.

Figure 19:
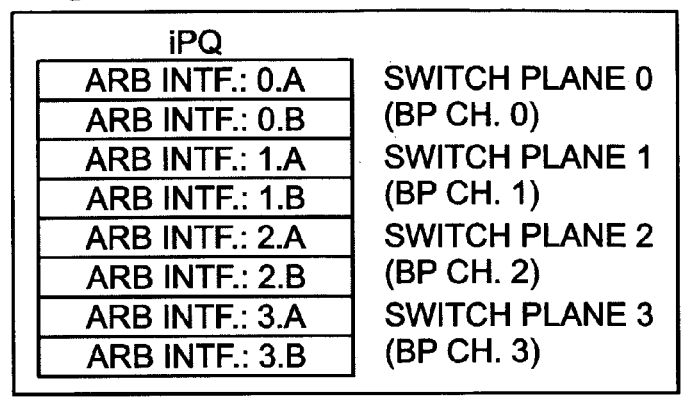
FIG. 19 is a diagram depicting iPQ arbiter interface to switchplane and backplane channel mapping.
Figure 27:
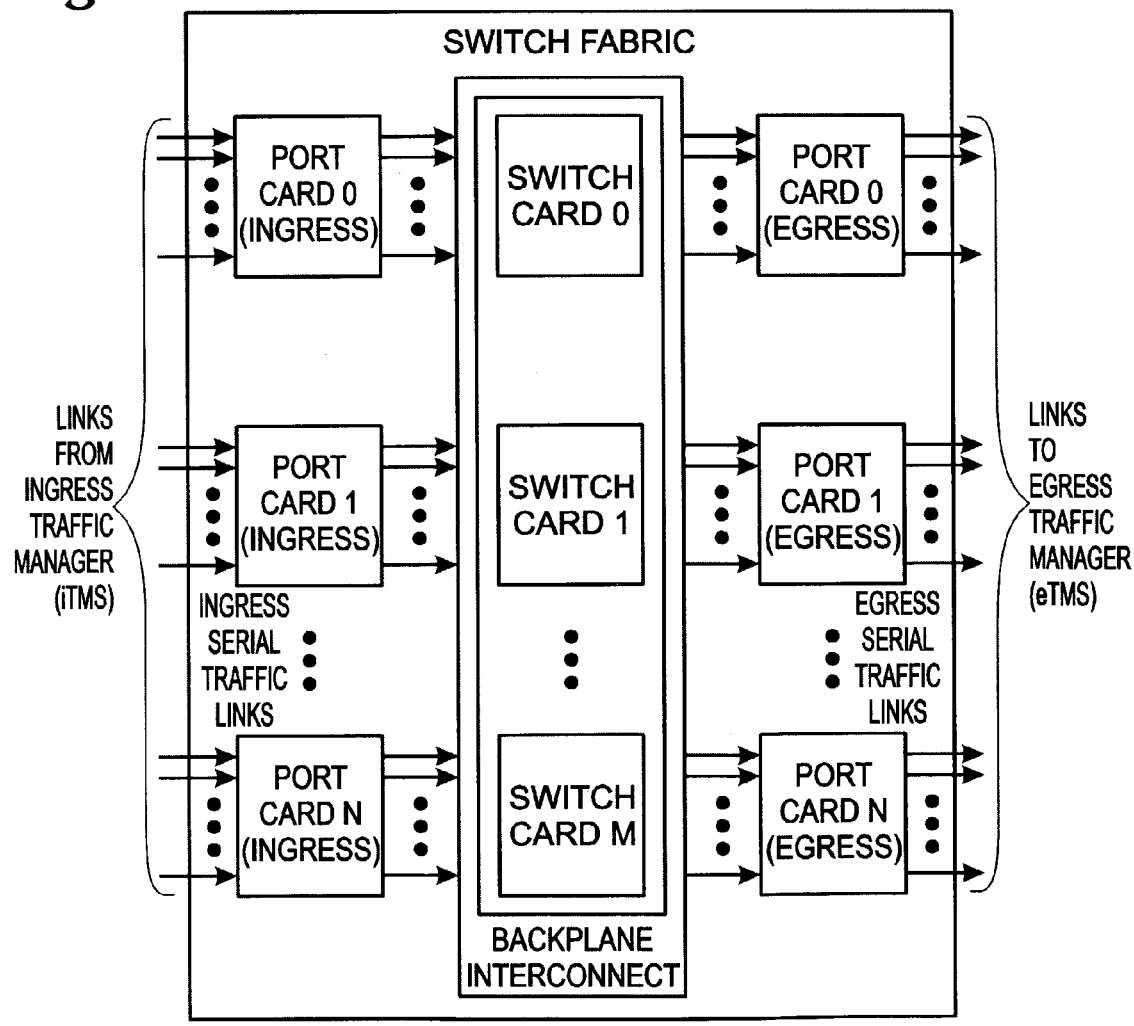
FIG. 27 is a schematic block diagram of a general switch fabric system (prior art).

FIG. 19 is a diagram depicting iPQ arbiter interface to switchplane and backplane channel mapping. The arbiter interfaces on the iPQ directly correspond to the backplane channels of the MS, as shown. In other words, arbiter interfaces 0.A and 0.B handles the bids and grants for backplane channel 0. The two arbiters attached to interfaces 0.A and 0.B form switchplane 0 (as shown in FIG. 20) that controls the crossbars attached to the links of backplane channel 0. An iPQ has 8 arbiter interfaces and can handle the bids and grants to 4 switch planes, thus servicing all the 4 backplane channels possible in an MS. A 4-ingress channel configuration, shown in FIG. 15, requires two iPQs and two MSs to support a 2× speedup (generates 8 backplane channels).

When there are two iPQs, each one controls a "bank" of switchplanes. To uniquely identify switchplanes, the associated backplane channel and switchplane bank must be known. The nomenclature SP X.Y is used where X is the switchplane number (and backplane channel) and Y is the switchplane bank. There are two switchplane banks, banks 0 and 1. Switchplane bank 0 switchplanes are defined as those connected to the iPQ that is servicing packets that came from ingress channels 0 and 2. Switchplane bank 1 switchplanes are defined as those connected to the iPQ servicing ingress channels 1 and 3.

The arbiters in a switchplane are denoted by the switchplane number and by the arbiter interface to which they are attached. An arbiter, and its switch card, is uniquely identified by the nomenclature Arb X.Y.Z, where X is the switchplane number, Y is the switchplane bank, and Z is the arbiter interface (A or B) on the iPQ from which the arbiter is receiving bids. An arbiter attached to an A interface handles bids and grants for even numbered links. The arbiter attached to the B interface handles the bids and grants for the odd numbered links of its backplane channel.

FIG. 20 is a schematic block diagram depicting the switch fabric backplane. The crossbars on the A cards are even numbered and those on the B cards are odd numbered. A specific crossbar ALWAYS handles the SAME numbered link from each of the port cards. For instance, all the link 0's of a specific backplane channel from all the port cards will be attached to the same crossbar, with the position on the crossbar set by which card in the system the link is coming from. In a 32-port system, this will entirely fill the crossbar with link 0's. The link 1's would then go to the first crossbar on the B card of the switchplane. The link 2's would go on the second crossbar of the A card. This relationship continues until all the crossbars in the switchplane are filled. Examples of the connectivity are provided below in a later section.

Speedup

Speedup has already been mentioned in terms of the number of links entering the MS, as compared to the number of links leaving the MS. That calculation results in the backplane speedup. There is also a speedup associated with getting into and out of an ingress or egress channel, respectively. This speedup is defined as the channel speedup. The channel speedup is dependent on the raw amount of traffic, the cell size, cellification efficiency, the number of links, and the link speed with the 8 B/10 B coding removed. Following are some examples that show the actual available link bandwidths using an 80% cellification efficiency:

64-byte unicast cell with 8 overhead bytes: The total available bandwidth for payload would then be 2 Gbps×56/64=1.75 Gbps. Given a cellification efficiency of 80%, there would then be 1.4 Gbps used for payload per link;

64-byte multicast cell with 11 overhead bytes: available payload bandwidth=2 Gbps×53/64=1.656 Gbps. With a cellification efficiency of 80%, there would then be 1.325 Gbps used for payload per link;

80-byte unicast cell with 8 overhead bytes: available payload bandwidth=2 Gbps×72/80=1.8 Gbps. With a cellification efficiency of 80%, there would then be 1.44 Gbps used for payload per link; and, 80-byte multicast cell with 11 overhead bytes: available payload bandwidth=2 Gbps×69/80=1.725 Gbps. With a cellification efficiency of 80%, there would then be 1.38 Gbps used for payload per link.

Using the first example, assuming an OC-192 (9.95328 Gbps) of raw data bandwidth, and 8 ingress links per channel, the channel speedup would be (8×1.4)/9.95328=1.125. The total system speedup, if the backplane speedup were 2, would be 1.125×2=2.25.

Active Redundancy

When cards in a switch plane fail or are removed, the iPQs automatically distribute the traffic across the remaining switchplanes. Since there is a speedup across the backplane, the loss or removal of a card would cause a decrease in the amount of switching resources but would not cause any traffic to stop being switched. In the case of a link failure, the crossbar informs its arbiter, and the arbiter ceases to grant connections for that link.

Configurations

The switch fabric can be optimized for three different port card counts. These optimizations result in reduced chip count and hence less system power. The fabric can be optimized for 8×8, 16×16, or 32×32 port card switching.

Number of Arbiters and Crossbars Required

The number of arbiters required in a system is dependent on the number of ingress/egress and backplane channels. Two arbiters are required to service a backplane channel when redundancy is required such that the following general relationship applies:

# of Arbiters=(# ingress channels×speedup×2 Arbiters per backplane channel)/divisor.

Values of less than 2 are rounded up to 2. In most systems, the minimum number of arbiters is 2. The speedup is either 1 or 2. If the actual speedup is greater than 1, then 2 should be used in the equation. For an 8×8 configuration, the divisor would be 4. For 16×16, the divisor is 2. For 32×32, the divisor would be 1.

The number of crossbars that are required in a system is dependent on how many links are being used to create the backplane channels. There should be an even number of crossbars and they would be divided evenly across the switch cards. The following equation, for most cases, provides the correct number of crossbars:

# of Crossbars=(# links per ingress channel×# of ingress channels per port×# of port cards×speedup)/32.

For the 8×8 configuration, the # of crossbars should be multiplied by (4×# of iMS)/(# backplane channels per port card). The number of port cards should be rounded up to the nearest supported configuration, i.e. 8, 16, or 32. The speedup in the case of crossbars should be the fractional speedup that is desired.

Example to determine the number of arbiters and crossbars for the following system:

4 channel port cards (40 Gbps)

8 links per channel 16 port cards

Speedup=1.5 # of arbiters=(4×2×2)/2=8 # of crossbars=(8×4×16×1.5)/32=24. This would give 3 crossbars per arbiter.

32×32 Configuration

The 32×32 configuration is used for all cases where expansion to 32 port cards is desired, or where the number of port cards is greater than 16. All configurations, including the 32×32, can be used with single channel, 2-channel, or 4-channel port cards. The 32×32 case is the simplest of cases to conceptually understand the wiring and is hence presented first.

Figure 21:
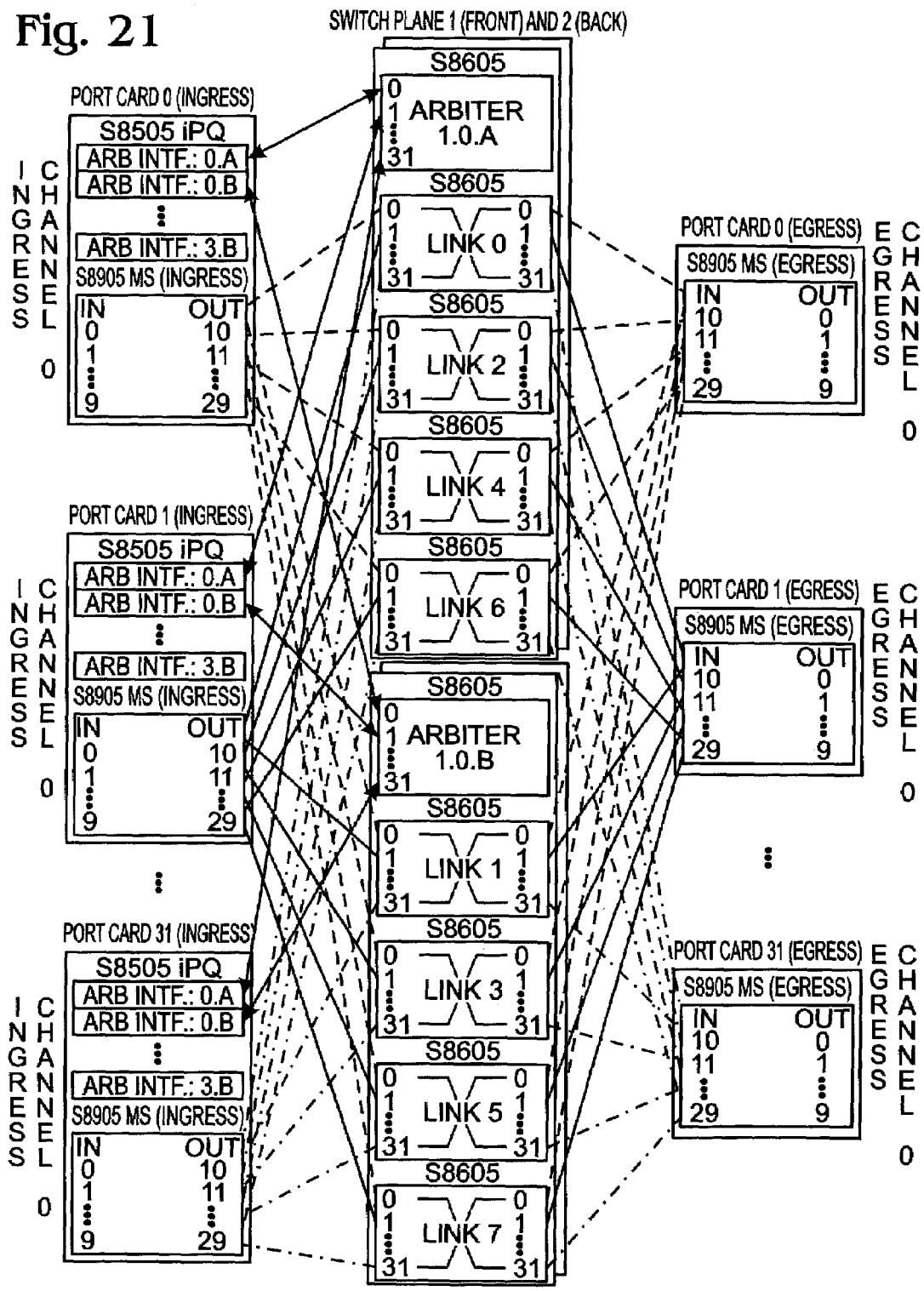
FIG. 21 is a schematic block diagram illustrating a 32×32 single channel system, using 8 links per channel, with a 2× backplane speedup.

FIG. 21 is a schematic block diagram illustrating a 32×32 single channel system, using 8 links per channel, with a 2× backplane speedup. This system is also optimized to use one MS for ingress and egress on each port card. The simplest correlation of backplane channels 1 and 2 on the port cards is with switch planes 1 and 2. In the figure, only the connectivity for switchplane 1 is drawn for clarity. Switchplane 2 is shown behind switchplane 1 and would be wired identically except that switchplane 2 would be connected to the PQs' arbiter 2 interface and a different backplane channel. Points to note in FIG. 21 are the following:

In the single channel configuration, the egress MS is the same device as the ingress MS. Ingress and egress links 30-39 on the MS would not be used and would be powered off. Arbiter interfaces 0.A, 0.B, 3.A and 3.B are unused and would be powered off. MS links 0-7 are used for both the ingress and egress to the traffic manager. Backplane channels 1 and 2 are used for the backplane connectivity. Each crossbar always handles the same numbered link from each port card. Link numbers on the crossbars correspond to the port card numbers. Link numbers on the MSs to the backplane, modulo 10, correspond to the backplane channel's link number. If it were desired to run 10-links per channel, a 5th crossbar would be added to each switch card.

To expand the system beyond a single ingress channel, thus adding more backplane channels, would require adding more switchplanes, with one switchplane per backplane channel.

In general, there should always be symmetry between the ingress and egress side of a port card, and the input and output sides of the backplane. When using multiple MSs, as in the 2- and 4-channel cases, the same symmetry would be maintained as in the single-channel case. Backplane channels would match up with each other as well as the link numbers the ingress and egress channels are using.

16×16 Configuration

The 16×16 configuration takes advantage of the fact that a 32×32 crossbar and arbiter can be treated as two 16×16 crossbars and arbiters. By doing this, the number of switchplanes, and hence arbiters and crossbars, required is reduced by half.

Figure 22:
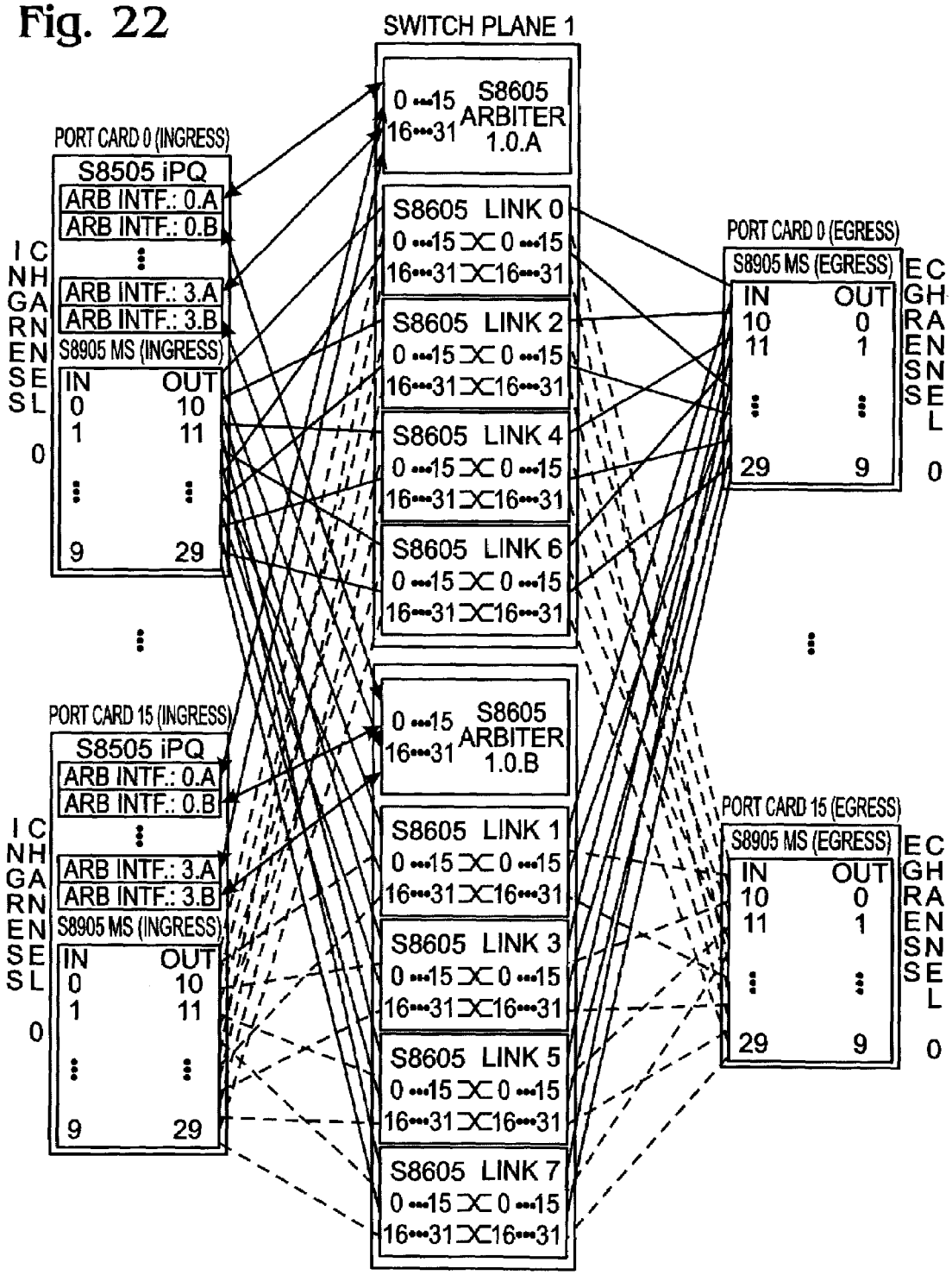
FIG. 22 is a schematic block diagram depicting a 16×16 channel system with 2× speedup.

FIG. 22 is a schematic block diagram depicting a 16×16 channel system with 2× speedup. 8 links per channel are used with non-aggregated bids. Points to note in FIG. 22 are the following:

In the single channel configuration, the egress MS is the same as the ingress MS. As far as the port card is concerned, the only difference between 16×16 and 32×32 is the organization of the switchplane. The port card remains the same. Backplane channels 1 and 2 are used for the backplane connectivity. Ingress and egress links 30-39 on the MS would not be used and would be powered off. Arbiter interfaces 0.A, 0.B, 3.A and 3.B on the PQ are unused and would be powered off. MS links 0-7 are used for both the ingress and egress to the traffic manager. Each crossbar always handles the same numbered link within a backplane channel from each port card. Link numbers on the crossbars, modulo 16, correspond to the port card numbers. Link numbers on the MSs to the backplane, modulo 10, correspond to the backplane channel's link number. If it were desired to run 10-links per channel, a 5th crossbar would be added to each switch card.

To expand to more than a single channel, the two-channel or four-channel port card would be used. The backplane connectivity would essentially remain the same except for the addition of more switch planes to handle the increase in backplane channels.

Figure 23:
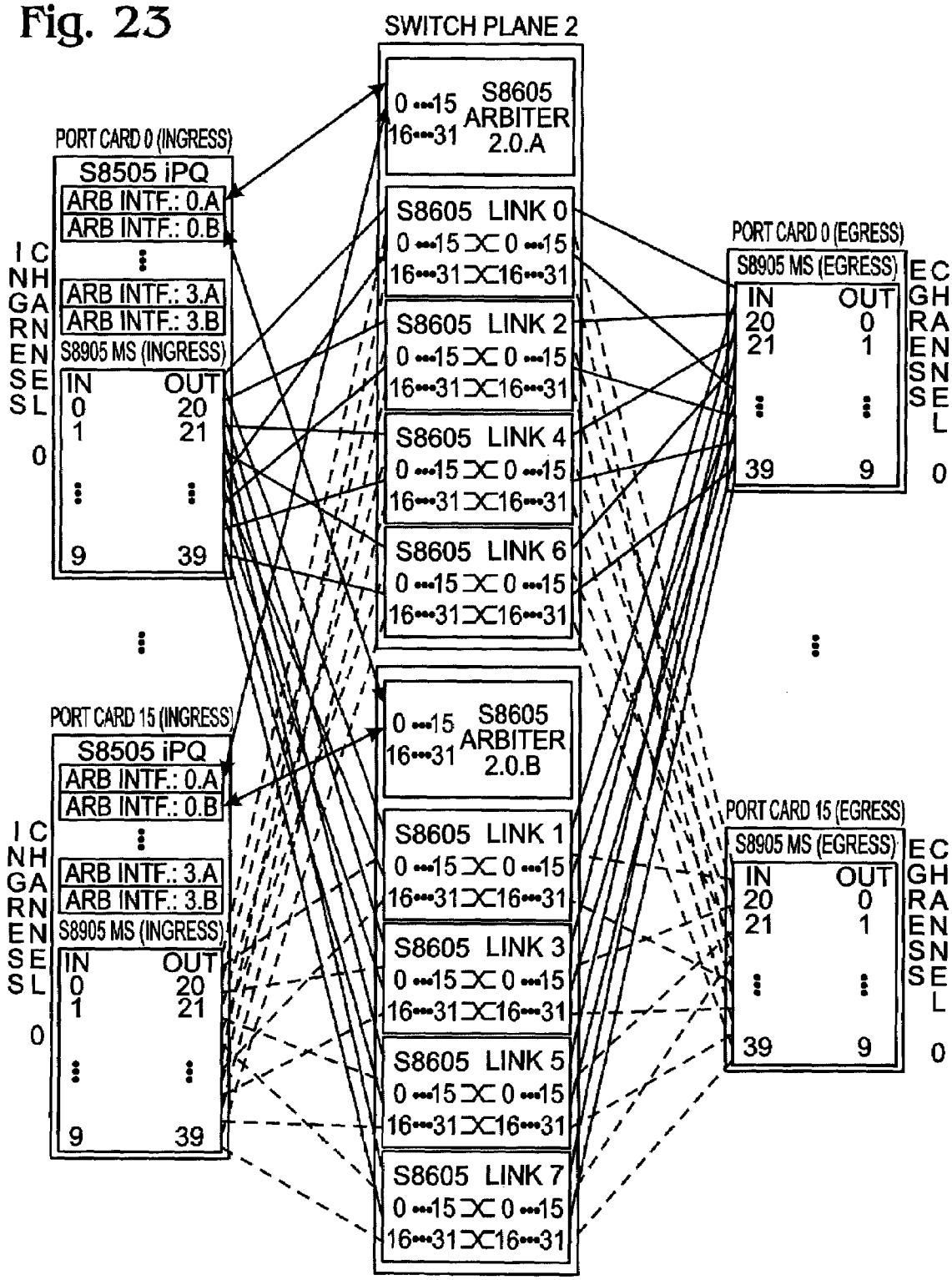
FIG. 23 is a schematic block diagram illustrating the connectivity of a 16×16 single channel system, with a 2× backplane speedup, using 8 links per channel and aggregated bids.

FIG. 23 is a schematic block diagram illustrating the connectivity of a 16×16 single channel system, with a 2× backplane speedup, using 8 links per channel and aggregated bids. The advantage of aggregating bids and grants is that the number of PQ to arbiter connections is reduced from 4 to 2 per port card. Points to note in FIG. 23 are the following:

In the single channel configuration, the egress MS is the same as the ingress MS. Since aggregation at the PQ for 2 backplane channels group [0, 1] together and [2, 3] together, bids and grants come through 2A and 2B. Backplane channels 2 and 3 are used for the backplane connectivity. Ingress and egress links 10-19 on the MS would not be used and would be powered off. Links 16-31 on the arbiters would not be used and would be powered off. Arbiter interfaces 0.A, 0.B, 1.A, 1.B, 3.A and 3.B on the PQ are unused and would be powered off. MS links 0-7 are used for both the ingress and egress to the traffic manager. Each crossbar always handles the same numbered link within a backplane channel from each port card. Link numbers on the crossbars, modulo 16, correspond to the port card numbers. Link numbers on the MSs to the backplane, modulo 10, correspond to the backplane channel's link number. If it were desired to run 10-links per channel, a 5th crossbar would be added to each switch card.

To expand to more than a single channel, the two-channel or four-channel port card would be used. The backplane connectivity would essentially remain the same except for the addition of more switch planes to handle the increase in backplane channels.

8×8 Configuration

The 8×8 configuration takes advantage of the fact that each arbiter and crossbar can be treated as four 8×8 arbiters and crossbars. In a system with 8 port cards or less, this means that there would be ¼ of the switching resources required to build the same system using the 32×32 configuration, or ½ of the switching resources to build the same system using the 16×16 configuration. If more than 8, but less than 17 port cards are required, then the 16×16 configuration would have to be used.

Figure 24:
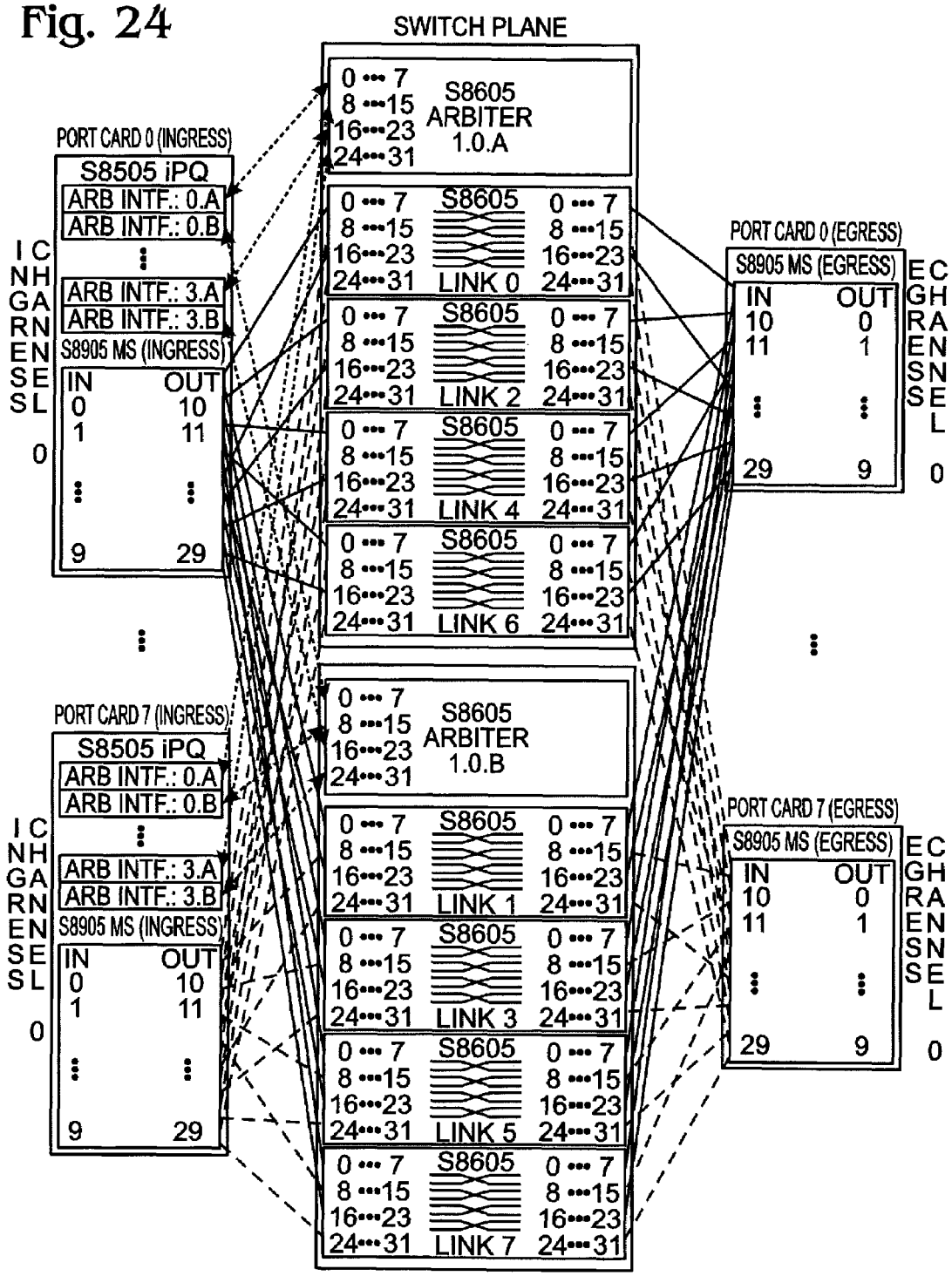
FIG. 24 is a schematic block diagram illustrating the connectivity for an 8×8 single channel system, with a 2× backplane speedup, using 8 links per channel and non-aggregated bids.

FIG. 24 is a schematic block diagram illustrating the connectivity for an 8×8 single channel system, with a 2× backplane speedup, using 8 links per channel and non-aggregated bids. Links 0-7 and 24-31 on the arbiter are not used. Bids and grants for the 4 sections of each crossbar are handled by the same arbiter. The points to note about the 8×8 configuration shown in FIG. 24 are the following:

In the single channel configuration, the egress MS is the same as the ingress MS. As far as the port card is concerned, the only difference between 8×8 and 16×16 is the organization of the switchplane. The port card remains the same. Ingress and egress links 30-39 on the MS would not be used and would be powered off. Links 0-7 and 24-31 on the arbiters would not be used and would be powered off. Links 0-7 and 24-31 on the crossbars would not be used and would be powered off. Arbiter interfaces 0.A, 0.B, 3.A and 3.B on the PQ are unused and would be powered off. MS links 0-7 are used for both the ingress and egress to the traffic manager. Backplane channels 1 and 2 are used for the backplane connectivity. Each crossbar always handles the same numbered link within a backplane channel from each port card. Link numbers on the crossbars, modulo 8, correspond to the port card numbers. Link numbers on the MSs to the backplane, modulo 10, correspond to the backplane channel's link number. If it were desired to run 10-links per channel, a 5th crossbar would be added to each switch card.

If the port cards in FIG. 24 were upgraded to 2-channel port cards, no additional switching resources would be required. Links 0-7 and 24-31 of each of the crossbars would be wired to handle the extra two backplane channels. To modify the system to handle 4-channel port cards would simply require the addition of a switch plane.

Figure 25:
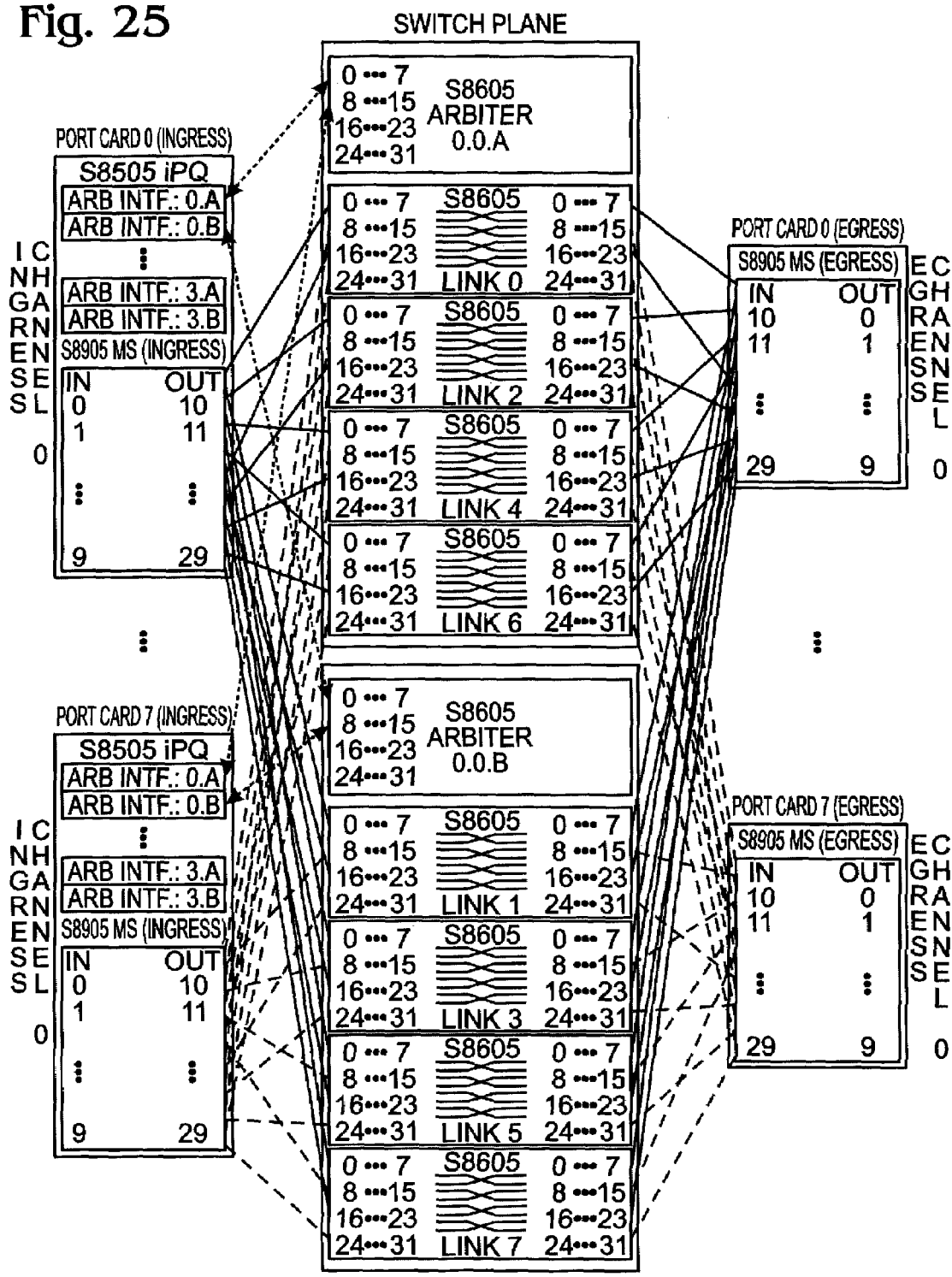
FIG. 25 is a schematic block diagram depicting the connectivity for an 8×8 single channel system, with a 2× backplane speedup, using 8 links per channel and aggregated bids.

FIG. 25 is a schematic block diagram depicting the connectivity for an 8×8 single channel system, with a 2× backplane speedup, using 8 links per channel and aggregated bids. Links 8-31 on the arbiter are not used in 8×8 mode, since the bids and grants for the 4 sections of each crossbar are aggregated and handled by the same arbiter interface. Bids and grants for unused crossbar sections will be nulled out at the PQ. The points to note about the 8×8 configuration shown in FIG. 25 are the following:

In the single channel configuration, the egress MS is the same as the ingress MS. As far as the port card is concerned, the only difference between 8×8 and 16×16 is the organization of the switchplane. The port card always remains the same. Ingress and egress links 30-39 on the MS would not be used and would be powered off. Links 8-31 on the arbiters would not be used and would be powered off. Links 0-7 and 24-31 on the crossbars would not be used and would be powered off. Arbiter interfaces 1.A through 3.B on the PQ are unused and would be powered off. MS links 0-7 are used for both the ingress and egress to the traffic manager. Backplane channels 1 and 2 are used for the backplane connectivity. Each crossbar always handles the same numbered link within a backplane channel from each port card. Link numbers on the crossbars, modulo 8, correspond to the port card numbers. Link numbers on the MSs to the backplane, modulo 10, correspond to the backplane channel's link number. If it were desired to run 10-links per channel, a 5th crossbar would be added to each switch card.

If the port cards in FIG. 25 were upgraded to 2-channel port cards, no additional switching resources would be required. Links 0-7 and 24-31 of each of the crossbars would be wired to handle the extra two backplane channels. To modify the system to handle 4-channel port cards would simply require the addition of a switch plane.

Figure 26B:
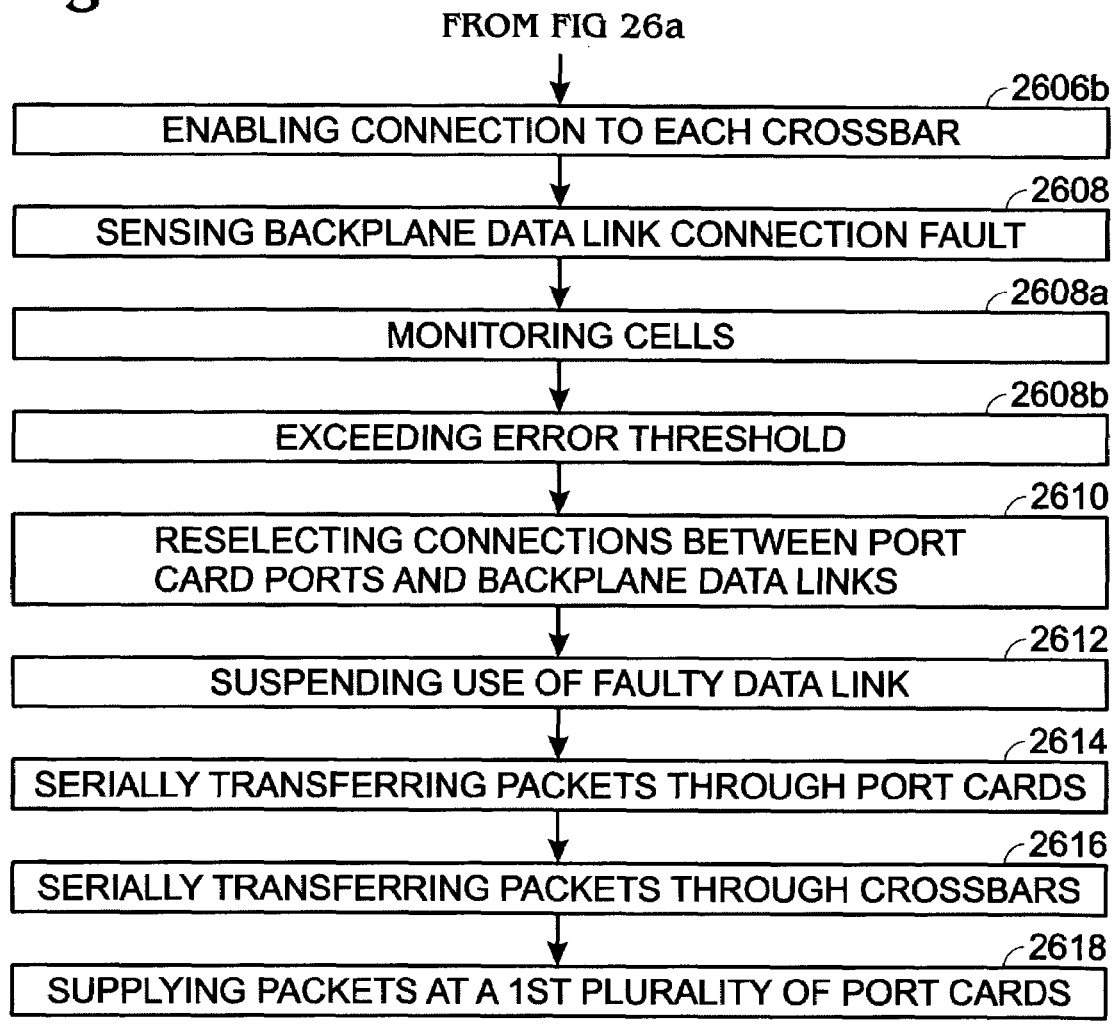

FIGS. 26a and 26b are flowcharts illustrating the present invention method for tolerating data line faults in a packet communications switch fabric. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 2600.

Step 2602 accepts information packets including a plurality of cells, at a plurality of ingress port card ports. The plurality of information packets addresses a plurality of egress port card ports. Step 2604 selectively connects port card ports to port card backplane data links. Step 2606 selectively connects port card backplane data links and crossbars. Step 2608 senses a connection fault in a backplane data link. Step 2610, in response to sensing the fault, reselects connections between the port card ports and the port card backplane data links. Step 2612, following the reselection of connections between the port card ports and the port card backplane data links, suspends use of the faulty connection. Step 2614, in response to reselecting connections between the port card ports and the port card backplane data links, serially transfers packets through the port cards (as defined above in the description of FIG. 1). Step 2616 serially transfers packets through the crossbars to the egress port cards.

In some aspects of the method, selectively connecting port card backplane data links and crossbars in Step 2606 includes substeps. Step 2606a, for a particular backplane data link, fixedly connects each port card to a corresponding interface of an assigned crossbar. Step 2606b selectively enables the connection to each crossbar. In some aspects, Step 2606b includes enabling the connection for the duration of the packet to be transferred.

In some aspects, serially transferring packets through the port cards in response to reselecting connections between the port card ports and the port card backplane data links in Step 2614 includes the part card transferring at the rate of one cell per cell cycle. Reselecting connections between the port card ports and the port card backplane data links in response to sensing the fault in Step 2610 includes reselecting connections within two cell cycles of detecting the fault.

In other aspects, fixedly connecting each port card to a corresponding interface of an assigned crossbar, for a particular backplane data link, in Step 2606a includes substeps. Step 2606a1 establishes a first plurality of crossbar input ports and a first plurality of crossbar output ports. Step 2606a2 establishes a third plurality of crossbars per switch card. Step 2606a3 establishes a fifth plurality of switch cards per switchplanes. Step 2606a4 establishes a seventh plurality of switchplanes per switchplane bank. Step 2606a5 establishes a fourth plurality of switchplane banks per backplane.

In some aspects of the method, sensing a connection fault in backplane data channel in Step 2608 includes sensing a connection fault in a connection between a port card ingress backplane data link and a crossbar input. Then, selectively connecting port card ports to port card backplane data links in Step 2604 includes substeps. Step 2604a includes each port card accepting packets on a sixth plurality of ingress data links (to one or more iTMs) through a corresponding sixth plurality of port card ingress ports. Step 2604b stores the accepted packets in a port card ingress memory subsystem (iMS). Step 2604c assigns packets to a second plurality of port card backplane data links. Step 2604d supplies assigned packets to the selected port card backplane data links from the iMS.

Step 2608, of sensing a connection fault in the backplane data links, also includes substeps. Step 2608a includes each crossbar monitoring cells received on the backplane data links. Step 2608b includes the received cells exceeding an error threshold. In some aspects, Step 2608 includes the iMS supplying packets in a sequence of cells coded in an 8 B/10 B algorithm. Then, exceeding an error threshold in Step 2608b includes the crossbar decoding received cells using the 8 B/10 B algorithm.

In some aspects, accepting information packets including a plurality of cells, at a plurality of port card ingress in Step 2602 includes receiving packets at a first plurality of port cards. Then, each port card accepting packets on a sixth plurality of ingress data links through a corresponding sixth plurality of port card ingress ports (Step 2604a) includes the sixth plurality of ingress ports being separated into a fourth plurality of ingress port groups. Storing the accepted packets in a port card iMS (Step 2604b) includes storing packets in a fourth plurality of iMSs corresponding to the fourth plurality of ingress port groups. Assigning packets to a second plurality of port card backplane data links (Step 2604c) includes assigning packets to a second plurality of port card backplane data links, separated into a fourth plurality of link divisions, each link division including a seventh plurality of channels, each channel including a fifth plurality of channel groups, each channel group including a third plurality of backplane ingress data links. Supplying assigned packets to the selected port card backplane channels from the iMS (Step 2604d) includes supplying packets from each iMS to a corresponding link division.

Establishing a fourth plurality of switchplane banks per backplane (Step 2606a5) includes Establishing a switchplane bank for each link division. Establishing a seventh plurality of switchplanes per switchplane bank Step (2606a4) includes establishing a switchplane for each channel in a link division. Establishing a fifth plurality of switch cards per switchplane bank (Step 2606a3) includes establishing a switch cards for each channel group in a channel. Establishing a third plurality of crossbars per switch card (Step 2606a2) includes establishing a crossbar for each corresponding data link in a channel group.

In one aspect, the first and sixth pluralities are a maximum number of 32, the second plurality is a maximum value of 64, the third and seventh pluralities are a maximum value of 4, and the fourth and fifth pluralities are a maximum value of 2.

In other aspects of the method the egress characteristics are specified. Sensing a connection fault in a backplane data link (Step 2608) includes sensing a connection fault in a connection from a crossbar output to a port card egress backplane data link. Then, selectively connecting port card ports to port card backplane data links in Step 2604 includes substeps. Because of the parallel nature of the ingress and egress ends of the method, the following egress characteristic substeps will be described in the text, but not shown to increase the clarity of the figure. Step 2604e includes each port card accepting packets on a second plurality of port card egress backplane data links from crossbar outputs. Step 2604f stores the accepted packets in a port card egress memory subsystem (eMS). Step 2604g assigns packets to a sixth plurality of port card egress ports. Step 2604h supplies assigned packets to selected port card ports from the eMS. Step 2604i includes each port card supplying packets on the sixth plurality of egress data links through the corresponding sixth plurality of port card egress ports.

Likewise, sensing a connection fault in the backplane data links in Step 2608 includes substeps (not shown). In Step 2608c each port card eMS monitors cells received en the backplane data links from the crossbars. In Step 2608d the received cells exceed an error threshold. In some aspects, sensing a connection fault in the backplane data link includes the port card eMS receiving packets in a sequence of cells coded in an 8 B/10 B algorithm. Then, exceeding an error threshold (Step 2608d) includes the port card decoding received cells using the 8 B/10 B algorithm.

In other aspects, accepting packets on a second plurality of port card egress backplane data links from crossbar outputs (Step 2604e) includes accepting packets on a second plurality of port card backplane data links, separated into a fourth plurality of link divisions, each link division including a seventh plurality of channels, each channel including a fifth plurality of channel groups, each channel group including a third plurality of data links. Supplying assigned packets to selected port card ports from the eMS (Step 2604i) includes supplying packets on the sixth plurality of egress ports separated into a fourth plurality of egress port groups.

As with the ingress side, establishing a fourth plurality of switchplane banks per backplane (Step 2606a5) includes establishing a switchplane bank for each link division. Establishing a seventh plurality of switchplanes per switchplane bank Step (2606a4) includes establishing a switchplane for each channel in a link division. Establishing a fifth plurality of switch cards per switchplane bank (Step 2606a3) includes establishing a switch cards for each channel group in a channel. Establishing a third plurality of crossbars per switch card (Step 2606a2) includes establishing a crossbar for each corresponding data link in a channel group.

In some aspects, a further step, Step 2618 supplies information packets including a plurality of cells at a first plurality of port cards. Matching the ingress side example, the first and sixth pluralities are a maximum number of 32, the second plurality is a maximum value of 64, the third and seventh pluralities are a maximum value of 4, and the fourth and fifth pluralities are a maximum value of 2.

A system and method of tolerating data line faults in a switch fabric has been present. Specific examples of switch fabric configurations have been presented to clarify and explain the invention. However, it should be understood that the invention is not limited to merely these examples. Other variations and embodiments of the invention will occur to those skilled in the art.

We claim:

1. A method for tolerating data line faults in a packet communications switch fabric, the method comprising:

accepting information packets including a plurality of cells, at a plurality of ingress port card ports, the plurality of information packets addressing a plurality of egress port card ports;

selectively connecting port card ports to port card backplane data links;

selectively connecting port card backplane data links and crossbars by fixedly connecting each port card to a corresponding interface of an assigned crossbar, for a particular backplane data link, as follows:
    establishing a first plurality of crossbar input ports and a first plurality of crossbar output ports;
    establishing a fourth plurality of switchplane banks per backplane;
    establishing a seventh plurality of switchplanes per switchplane bank;
    establishing a fifth plurality of switch cards per switchplane; and,
    establishing a third plurality of crossbars per switch card; and,
    selectively enabling the connection to each crossbar;

sensing a connection fault in a backplane data link as follows:
    each crossbar monitoring cells received on the backplane data links; and,
    a crossbar supplying an error message to a port card in response to the received cells on a connected backplane data link exceeding an error threshold;

in response to receiving the error message, the port card reselecting a backplane data link;

in response to reselecting connections between the port card ports and the port card backplane data links, serially transferring packets through the port cards; and, serially transferring packets through the crossbars to the egress port cards.

2. The method of claim 1 wherein selectively enabling the connection to each crossbar includes enabling the connection for the duration of the packet to be transferred.

3. The method of claim 1 further comprising:
following the reselection of connections between the port card ports and the port card backplane data links, suspending use of the faulty connection.

4. The method of claim 1 wherein serially transferring packets through the port cards in response to reselecting connections between the port card ports and the port card backplane data links includes the port card transferring at the rate of one cell per cell cycle; and,
wherein reselecting connections between the port card ports and the port card backplane data links in response to sensing the fault includes reselecting connections within two cell cycles of detecting the fault.

5. The method of claim 1 wherein sensing a connection fault in backplane data channel includes sensing a connection fault in a connection between a port card ingress backplane data link and a crossbar input.

6. The method of claim 5 wherein selectively connecting port card ports to port card backplane data links includes:
each port card accepting packets on a sixth plurality of traffic manager ingress links through a corresponding sixth plurality of port card ingress ports;
storing the accepted packets in a port card ingress memory subsystem (iMS);
assigning packets to a second plurality of port card backplane data links; and,
supplying assigned packets to the selected port card backplane data links from the iMS.

7. The method of claim 6 wherein sensing a connection fault in the backplane data link includes the iMS supplying packets in a sequence of cells coded in an 8 B/10 B algorithm; and,
    wherein exceeding an error threshold includes the crossbar decoding received cells using the 8 B/10 B algorithm.

8. The method of claim 6 wherein accepting information packets including a plurality of cells, at a plurality of port card ingress includes receiving packets at a first plurality of port cards;
    wherein each port card accepting packets on a sixth plurality of traffic manager ingress links through a corresponding sixth plurality of port card ingress ports includes the sixth plurality of ingress ports being separated into a fourth plurality of ingress port groups;
    wherein storing the accepted packets in a port card iMS includes storing packets in a fourth plurality of iMSs corresponding to the fourth plurality of ingress port groups;
    wherein assigning packets to a second plurality of port card backplane data links includes assigning packets to a second plurality of port card backplane data links, separated into a fourth plurality of link divisions, each link division including a seventh plurality of channels, each channel including a fifth plurality of channel groups, each channel group including a third plurality of backplane ingress data links;
    wherein supplying assigned packets to the selected port card backplane channels from the iMS includes supplying packets from each iMS to a corresponding link division;
    wherein establishing a fourth plurality of switchplane banks per backplane includes establishing a switchplane bank for each link division;
    wherein establishing a seventh plurality of switchplanes per switchplane bank includes establishing a switchplane for each channel in a link division;
    wherein establishing a fifth plurality of switch cards per switchplane bank includes establishing a switch cards for each channel group in a channel; and,
    wherein establishing a third plurality of crossbars per switch card includes establishing a crossbar for each corresponding data link in a channel group.

9. The method of claim 8 wherein the first and sixth pluralities are a maximum number of 32; and,
    wherein the second plurality is a maximum value of 64.

10. The method of claim 9 wherein the third and seventh pluralities are a maximum value of 4; and,
    wherein the fourth and fifth pluralities are a maximum value of 2.

11. The method of claim 1 wherein sensing a connection fault in a backplane data link includes sensing a connection fault in a connection from the crossbar output to a port card egress backplane data link.

12. The method of claim 11 wherein selectively connecting port card ports to port card backplane data links includes:
    each port card accepting packets on a second plurality of port card egress backplane data links from crossbar outputs;
    storing the accepted packets in a port card egress memory subsystem (eMS);
    assigning packets to a sixth plurality of port card egress ports;
    supplying assigned packets to selected port card ports from the eMS; and,
    each port card supplying packets on the sixth plurality of egress data links through the corresponding sixth plurality of port card egress ports.

13. The method of claim 12 wherein sensing a connection fault in the backplane data links includes:
    each port card eMS monitoring cells received on the backplane data links from the crossbars; and,
    the received cells exceeding an error threshold.

14. The method of claim 13 wherein sensing a connection fault in the backplane data link includes the port card eMS receiving packets in a sequence of cells coded in an 8 B/10 B algorithm; and,
    wherein exceeding an error threshold includes the port card decoding received cells using the 8 B/10 B algorithm.

15. The method of claim 13 wherein accepting packets on a second plurality of port card egress backplane data, links from crossbar outputs includes accepting packets on a second plurality of port card backplane data links, separated into a fourth plurality of link divisions, each link division including a seventh plurality of channels, each channel including a fifth plurality of channel groups, each channel group including a third plurality of data links;
    wherein supplying assigned packets to selected port card ports from the eMS includes supplying packets on the sixth plurality of egress ports separated into a fourth plurality of egress port groups;
    wherein establishing a fourth plurality of switchplane banks per backplane includes establishing a switchplane bank for each link division;
    wherein establishing a seventh plurality of switchplanes per switchplane bank includes establishing a switchplane for each channel in a link division;
    wherein establishing a fifth plurality of switch cards per switchplane bank includes establishing a switch cards for each channel group in a channel; and,
    wherein establishing a third plurality of crossbars per switch card includes establishing a crossbar for each corresponding data link in a channel group; and,
    further comprising:
    supplying information packets including a plurality of cells at a first plurality of port cards.

16. The method of claim 15 wherein the first and sixth pluralities are a maximum number of 32; and,
    wherein the second plurality is a maximum value of 64.

17. The method of claim 16 wherein the third and seventh pluralities are a maximum value of 4; and,
    wherein the fourth and fifth pluralities are a maximum value of 2.

18. A switch fabric system for tolerating data line faults in packet communications, the system comprising:
    a plurality of port cards, each port card including:
        a plurality of ports to communicate information packets, including a plurality of cells, with a network;
        a plurality of backplane data links to serially transfer packets between port cards on connected ingress/egress data links;
        at least one priority queue (PQ) having a control port to accept faulty packet error messages, to send transfer messages reselecting intra-port card connections between ports and the backplane data links in response to error messages, and to communicate messages controlling the inter-port card transfer of packets on the backplane data links, and;
    at least one crossbar having a first plurality of crossbar input ports connected to ingress backplane data links, a first plurality of crossbar output ports connected to egress backplane data links, and a control input operatively connected to accept control signals from the PQ, the crossbar having an interface fixedly connected, and selectively enabled to a backplane data link from each port card for selectively connecting crossbar inputs and crossbar outputs, to serially transfer packets in response to the PQ control signals, the crossbar monitoring cells received on backplane data links and sending an error message to a PQ in response to the received cells on a backplane data link exceeding an error threshold;

wherein the PQs reselect backplane data links in response to receiving the error messages from the crossbars;

the system further comprising:

a backplane including a fourth plurality of switchplane banks, each switchplane bank including a seventh plurality of switchplanes, each switchplane including a fifth plurality of switch cards, each switch card including a third plurality of crossbars.

19. The system of claim 18 wherein the crossbar interface is enabled for the duration of the packet being serially transferred through the crossbar.

20. The system of claim 18 wherein the PQ, following the reselection of intra-port card connections between the ports and the backplane channels, sends transfer messages suspending use of the backplane data link.

21. The system of claim 18 further comprising:

a clock having an cell cycle output connected to each port card and crossbar; and, wherein the port card serially transfers packets on the backplane data links at the rate of one cell per cell cycle; and, wherein the PQ sends a transfer message reselecting intra-port card connections within two cell cycles of receiving an error message.

22. The system of claim 18 wherein each port card includes an ingress PQ (iPQ) to reselect intra-port card connections in response to receiving an error message from the crossbar indicating a fault between a port card ingress backplane data links and a crossbar input.

23. The system of claim 22 wherein each port card further includes:

a sixth plurality of ingress ports to accept packets on a sixth plurality of ingress data links, an ingress memory system (iMS) having inputs connected to the ingress ports to receive packets for storage, an input connected to the iPQ to accept transfer commands, and outputs connected to the ingress backplane data links to supply stored packets in response to the transfer commands; and, wherein each port card includes a second plurality of ingress backplane data links.

24. The system of claim 23 wherein each crossbar includes a monitor having an input to accept cells received on the ingress backplane data links and an output operatively connected to the iPQ to supply an error message in response to the received cells exceeding an error threshold.

25. The system of claim 24 wherein the port card iMS supplies the packets in a sequence of cells coded in an 8 B/10 B algorithm; and, wherein the crossbar monitor decodes the received cells using the 8 B/10 B algorithm.

26. The system of claim 24 wherein the plurality of port cards are a first plurality of combination ingress/egress port cards;

wherein the sixth plurality of ingress ports are separated into a fourth plurality of ingress port groups;

wherein the iMS is separated into a fourth plurality of iMSs corresponding to the fourth plurality of ingress port groups;

wherein the second plurality of backplane data links are separated into a fourth plurality of link divisions corresponding to the fourth plurality of iMSs, each link division including a seventh plurality of channels, each channel including a fifth plurality of channel groups, each channel group including a third plurality of data links;

wherein the iPQ is separated into a fourth plurality of iPQs corresponding to the fourth plurality of iMSs;

wherein the fourth plurality of switchplane banks correspond to the fourth plurality of iPQs;

wherein the seventh plurality of switchplanes correspond to the seventh plurality of channels per link division;

wherein the fifth plurality of switch cards correspond to the fifth plurality of channel groups per channel; and, wherein the third plurality of crossbars correspond to the third plurality of data links per channel group.

27. The system of claim 26 wherein the first and sixth pluralities are a maximum number of 32; and, wherein the second plurality is a maximum value of 64.

28. The system of claim 27 wherein the third and seventh pluralities are a maximum value of 4; and, wherein the fourth and fifth pluralities are a maximum value of 2.

29. The system of claim 18 wherein each port card includes an egress PQ (oPQ) to reselect intra-port card connections in response to receiving an error message indicating a fault between a port card egress backplane data link and a crossbar output.

30. The system of claim 29 wherein each port card further includes:

an egress memory system (eMS) having inputs connected to the egress backplane data links to receive packets for storage, an input connected to an oPQ to accept transfer commands, and outputs connected to the egress ports to supply stored packets in response to the transfer commands;

wherein each port card includes a sixth plurality a sixth plurality of egress ports; and, wherein each port card includes a second plurality of egress backplane data links.

31. The system of claim 30 wherein each eMS includes a monitor having an input to accept cells received on the backplane data links and an output to supply error messages to the oPQ in response to the received cells exceeding an error threshold.

32. The system of claim 31 wherein the crossbar supplies the packets in a sequence of cells coded in an 8 B/10 B algorithm; and, wherein the eMS monitor decodes the received cells using the 8 B/10 B algorithm.

33. The system of claim 31 wherein the plurality of port cards are a first plurality of combination ingress/egress port cards;

wherein the sixth plurality of egress ports are separated into a fourth plurality of egress port groups;

wherein the second plurality of backplane data links are separated into a fourth plurality of link divisions, each link division including a seventh plurality of channels, each channel including a fifth plurality of channel groups, each channel group including a third plurality of data links;

wherein the fourth plurality of switchplane banks correspond to the fourth plurality of link divisions;

wherein the seventh plurality of switchplanes correspond to the seventh plurality of channels; and, wherein the fifth plurality of switch cards corresponding to the fifth plurality of channel groups.

34. The system of claim 33 wherein the first and sixth pluralities are a maximum number of 32; and, wherein the second plurality is a maximum value of 64.

35. The system of claim 34 wherein the third and seventh pluralities are a maximum value of 4; and, wherein the fourth and fifth pluralities are a maximum value of 2.

* * * * *